(12) United States Patent
Gomi et al.

(10) Patent No.: US 8,353,378 B2
(45) Date of Patent: *Jan. 15, 2013

(54) FRICTIONAL DRIVE DEVICE AND INVERTED PENDULUM TYPE VEHICLE USING THE SAME

(75) Inventors: Hiroshi Gomi, Wako (JP); Shinichiro Kobashi, Wako (JP); Toru Takenaka, Wako (JP); Kazushi Hamaya, Wako (JP); Wataru Yada, Wako (JP); Kazushi Akimoto, Wako (JP); Yuichi Uebayashi, Wako (JP); Hironori Waita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 12/884,738

(22) Filed: Sep. 17, 2010

(65) Prior Publication Data

US 2011/0067937 A1    Mar. 24, 2011

(30) Foreign Application Priority Data

Sep. 18, 2009 (JP) ................. 2009-217824
Sep. 18, 2009 (JP) ................. 2009-217838
Sep. 18, 2009 (JP) ................. 2009-217919

(51) Int. Cl.
*B62K 1/00* (2006.01)

(52) U.S. Cl. .......... 180/218; 180/21; 280/205; 280/208

(58) Field of Classification Search .................. 180/6.5, 180/7.1, 20, 21, 65.1, 218, 282; 280/78, 280/205, 208
See application file for complete search history.

(56) References Cited

U.S. PATENT DOCUMENTS 1,654,862 A    12/1925   Clyne
(Continued)

FOREIGN PATENT DOCUMENTS

JP    2003-79006    3/2003
(Continued)

OTHER PUBLICATIONS

Hiroshi Gomi et al., U.S. Patent Application titled "Inverted Pendulum Type Vehicle", Filing Date: Sep. 17, 2010, specification and drawings, a total of 44 pages.

(Continued)

*Primary Examiner* — Paul N Dickson
*Assistant Examiner* — Barry Gooden, Jr.
(74) *Attorney, Agent, or Firm* — Squire Sanders (US) LLP

(57) ABSTRACT

A frictional drive device comprises a pair of drive disks (48) each rotatably supported by a frame (2, 42) around a central axial line (A) in a mutually opposing relationship, and a pair of actuators (64) supported by the frame for individually rotatively actuating the drive disks and coaxially disposed with respect to the corresponding drive disks, a plurality of drive rollers (56) arranged along an outer periphery of each drive disk and each having a rotational center line so as to be rotatable along a plane which is neither parallel nor perpendicular to the central axial line, and an annular main wheel (85) disposed approximately coaxially with respect to the central axial line and engaged by the drive rollers of the drive disks, the main wheel comprising an annular member (86) and a plurality of driven rollers (92) supported along the annular member so as to be rotatable around a tangential line of the annular member. A speed reduction unit (72, 100) may be interposed between each actuator and the corresponding drive disk all in a coaxial relationship.

12 Claims, 16 Drawing Sheets

U.S. PATENT DOCUMENTS

| | | | |
|---|---|---|---|
| 3,399,742 A | 9/1968 | Malick | |
| 3,746,117 A * | 7/1973 | Alred | 180/21 |
| 5,314,034 A * | 5/1994 | Chittal | 180/21 |
| 5,701,965 A | 12/1997 | Kamen et al. | |
| 5,791,425 A | 8/1998 | Kamen et al. | |
| 6,150,794 A | 11/2000 | Yamada et al. | |
| 6,173,799 B1 * | 1/2001 | Miyazaki et al. | 180/19.3 |
| 7,337,862 B1 * | 3/2008 | Greenley et al. | 180/10 |
| 7,424,927 B2 | 9/2008 | Hiramatsu | |
| 7,823,676 B2 | 11/2010 | Yamada et al. | |
| 7,866,429 B2 | 1/2011 | Ishii et al. | |
| 7,963,352 B2 * | 6/2011 | Alexander | 180/21 |
| 7,980,336 B2 * | 7/2011 | Takenaka et al. | 180/7.1 |
| 2001/0000394 A1 | 4/2001 | Whittaker | |
| 2003/0075366 A1 * | 4/2003 | Sabatie | 180/7.1 |
| 2007/0158117 A1 * | 7/2007 | Alexander | 180/21 |
| 2008/0147281 A1 | 6/2008 | Ishii et al. | |
| 2008/0284375 A1 | 11/2008 | Nagaoka et al. | |
| 2009/0288900 A1 * | 11/2009 | Takenaka et al. | 180/218 |
| 2010/0023220 A1 | 1/2010 | Nakashima et al. | |
| 2010/0063719 A1 | 3/2010 | Doi | |
| 2010/0096905 A1 * | 4/2010 | Takenaka et al. | 301/5.23 |
| 2010/0139996 A1 * | 6/2010 | Takenaka et al. | 180/20 |
| 2011/0067935 A1 * | 3/2011 | Gomi et al. | 180/21 |
| 2011/0067936 A1 * | 3/2011 | Takenaka et al. | 180/21 |
| 2011/0067937 A1 | 3/2011 | Gomi et al. | |
| 2011/0067938 A1 * | 3/2011 | Gomi et al. | 180/21 |
| 2011/0067939 A1 * | 3/2011 | Takenaka | 180/21 |
| 2011/0067940 A1 * | 3/2011 | Takenaka | 180/218 |
| 2011/0067943 A1 * | 3/2011 | Waita et al. | 180/311 |
| 2011/0068738 A1 * | 3/2011 | Gomi et al. | 320/108 |
| 2011/0070997 A1 * | 3/2011 | Gomi et al. | 476/66 |
| 2011/0070998 A1 * | 3/2011 | Takenaka et al. | 476/68 |
| 2011/0071714 A1 * | 3/2011 | Takenaka | 701/22 |
| 2011/0071715 A1 * | 3/2011 | Akimoto et al. | 701/22 |
| 2011/0071752 A1 * | 3/2011 | Takenaka et al. | 701/124 |
| 2011/0115279 A1 * | 5/2011 | Gomi et al. | 301/5.23 |
| 2011/0118968 A1 * | 5/2011 | Takenaka et al. | 701/124 |
| 2011/0139520 A1 * | 6/2011 | Gulak | 180/21 |
| 2011/0144845 A1 * | 6/2011 | Takenaka | 701/22 |
| 2011/0209932 A1 * | 9/2011 | Takenaka et al. | 180/15 |
| 2011/0220427 A1 * | 9/2011 | Chen | 180/21 |
| 2011/0233989 A1 * | 9/2011 | Takenaka et al. | 301/5.23 |
| 2012/0061156 A1 * | 3/2012 | Takenaka et al. | 180/21 |

FOREIGN PATENT DOCUMENTS

| | | |
|---|---|---|
| JP | 2006074868 | 3/2006 |
| JP | 2006-282160 | 10/2006 |
| JP | 2009-106138 | 5/2009 |
| WO | 2008/132779 | 11/2008 |

OTHER PUBLICATIONS

Hiroshi Gomi et al., U.S. Patent Application titled "Recharging System for a Rechargeable Battery of an Inverted Pendulum Type Vehicle", Filing Date: Sep. 17, 2010, specification and drawings, a total of 81 pages.

Japanese Office Action; dated Jun. 14, 2012, Issued on corresponding JP Application No. 2009-273363.

Non-Final Office Action; dated May 31, 2012, Issued on related U.S. Appl. No. 12/884,748.

* cited by examiner

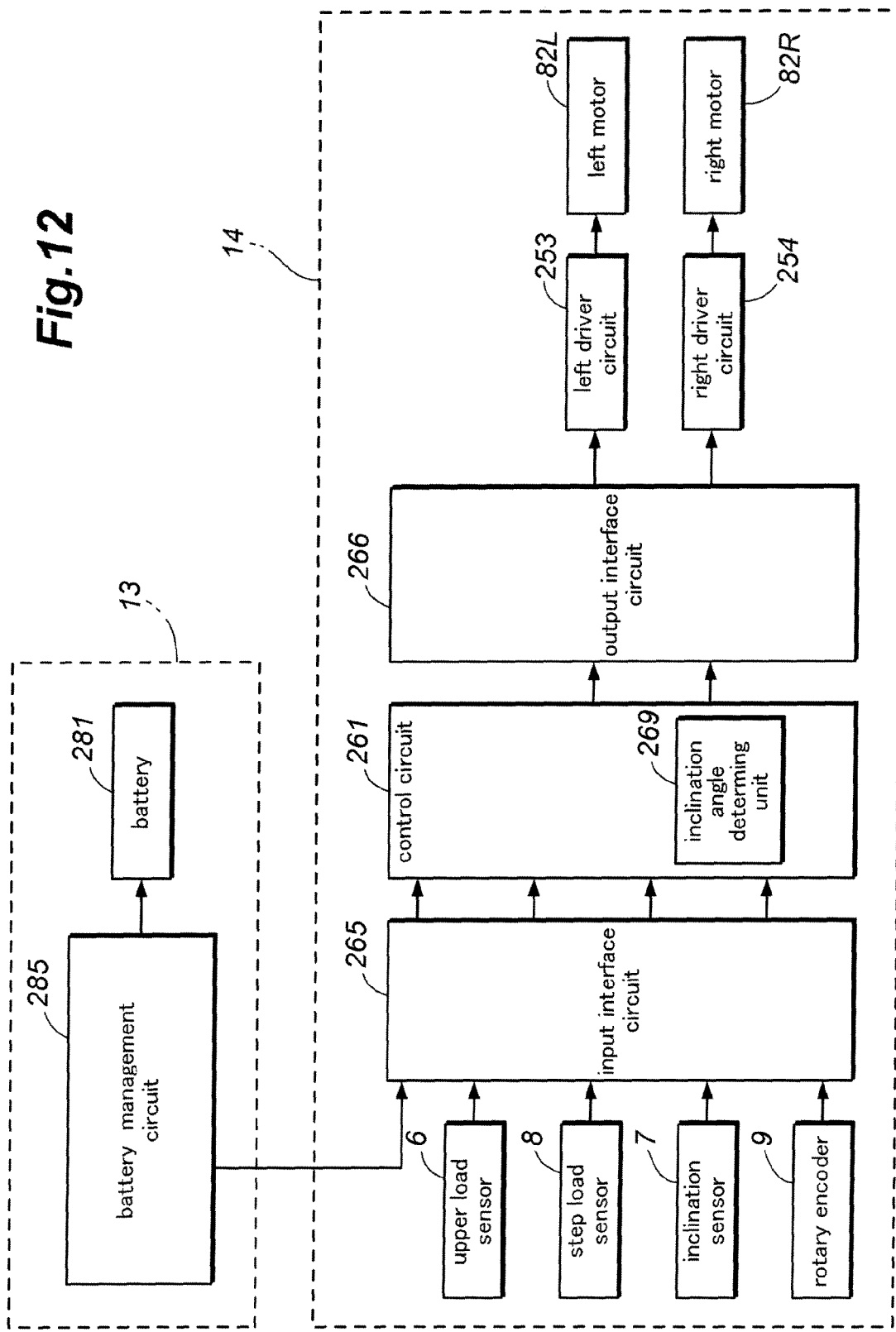

Fig. 13a
Fig. 13b
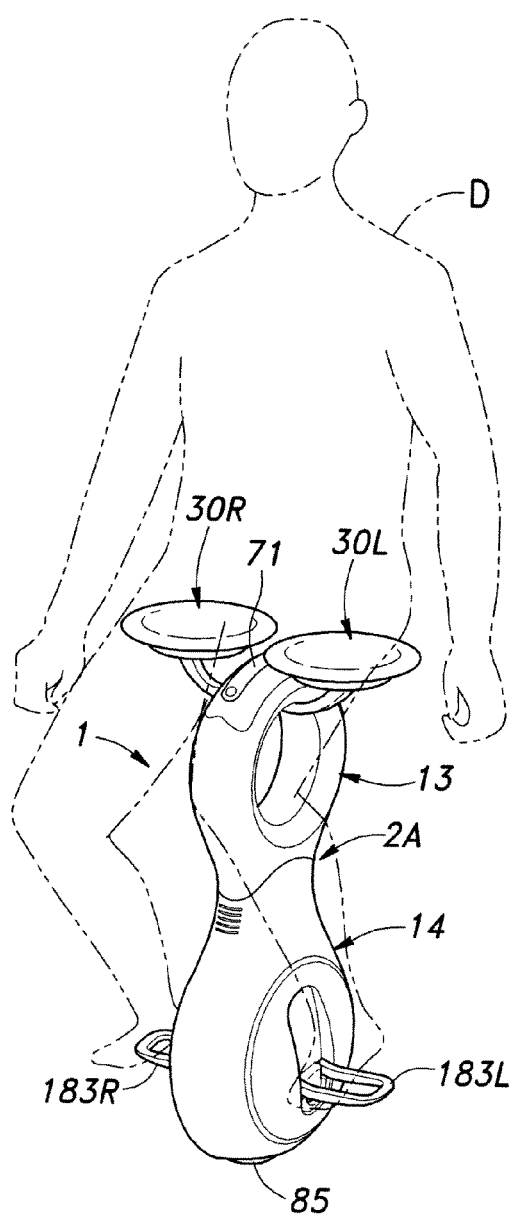
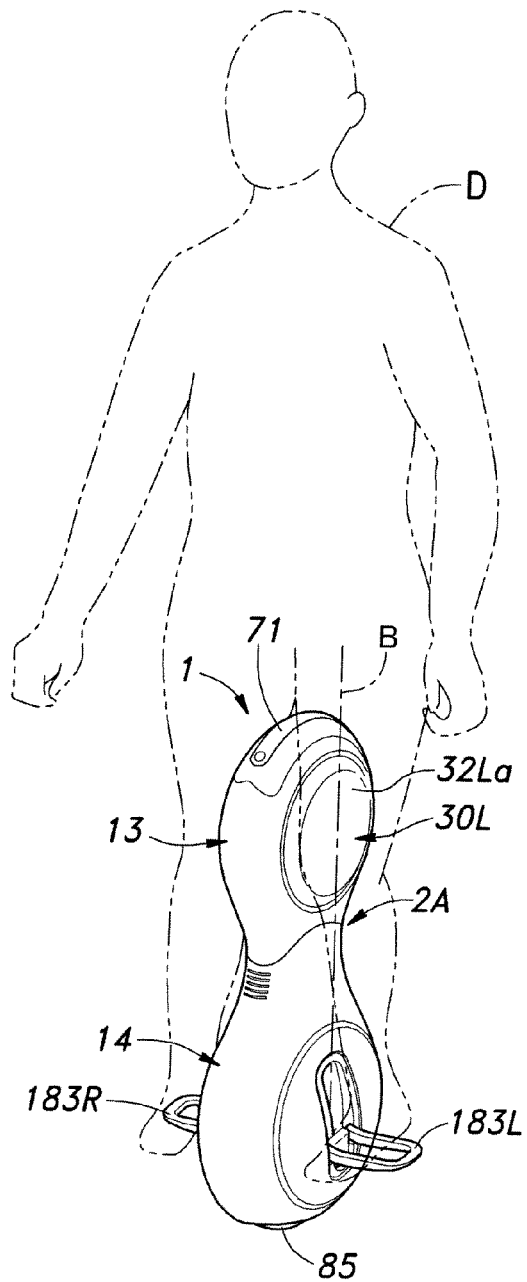

FRICTIONAL DRIVE DEVICE AND INVERTED PENDULUM TYPE VEHICLE USING THE SAME

TECHNICAL FIELD

The present invention relates to a frictional drive device and an inverted pendulum type vehicle using the same, and in particular to a frictional drive device suitable for use as a propulsion device for a vehicle and an inverted pendulum type vehicle using the same.

BACKGROUND OF THE INVENTION

Known is an inverted pendulum type vehicle or an omni-directional vehicle comprising a pair of drive assemblies individually actuated by electric motors and a main wheel held between the drive assemblies and frictionally driven by the drive assemblies. See WO2008132779A1 (US20100096905A1) (patent document 1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

The frictional drive device for this vehicle requires the two drive disks to be rotatively actuated individually, and electric motors are provided individually for the two drive disks. In the previously proposed frictional drive device, the motors are provided radially spaced away from the corresponding drive disks, and power transmission devices such as those using endless belts were required to transmit the power of the electric motors to the corresponding drive disks.

Therefore, the frictional drive device was highly complex in structure, and difficult to maintain owing to poor accessibility of various parts. Also, the need for the power transmission devices prevented a compact design of the frictional drive device.

The frictional drive device of this type requires a plurality of rollers to be mounted on each drive disk in a specific orientation. In the previous proposal, each drive roller is mounted on a bracket via a roller shaft, and the bracket was in turn fixedly secured to a peripheral part of the drive disk. Therefore, a large number of brackets were required, and this necessitated a large number of component parts and many work hours of assembly work. Also, special jigs were required for the assembly work, and this impaired the efficiency of the assembly work, and increased the manufacturing cost. Furthermore, the need for the brackets impaired the assembling precision, and this reduced the performance or efficiency of the frictional drive device.

The vehicles of this type are suited to have a small footprint (area of the image of the vehicle projected on the ground surface), and this enables the vehicle to travel in narrow spaces. Japanese patent laid open publication No. 2006-282160 (patent document 2) discloses such an inverted pendulum type vehicle comprising a robot main body consisting of a spherical wheel and an omni-directional drive unit for rolling the spherical wheel in a desired direction, and a control unit for maintaining the robot main body in an upright posture under an inverted pendulum control.

In this vehicle, the robot main body further includes a casing receiving a battery, a control computer, motor drivers, a gyro sensors and other control components, and a protective cover attached to a lower part of the casing and covers the omni-directional drive unit. When this structure is applied to an inverted pendulum vehicle using a main wheel having a relatively small width, the protective cover may have a small width, but the casing is required to have a large width that does not match the narrow width of the protective cover. Therefore, the vehicle is prevented from having a small footprint.

BRIEF SUMMARY OF THE INVENTION

In view of such problems of the prior art, a primary object of the present invention is to provide a frictional drive device of the aforementioned type which is highly compact, and easy to maintain.

A second object of the present invention is to provide a friction drive device which requires a small number of component parts.

A third object of the present invention is to provide a friction drive device which is easy to assembly and can be assembled at a high precision.

According to the present invention, such objects can be accomplished by providing a frictional drive device, comprising a frame; a pair of drive disks each rotatably supported by the frame around a central axial line in a mutually opposing relationship; a pair of actuators supported by the frame for individually rotatively actuating the drive disks; a plurality of drive rollers arranged along an outer periphery of each drive disk and each having a rotational center line so as to be rotatable along a prescribed plane of rotation; and an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member, wherein each actuator comprises a rotary actuator coaxially disposed with respect to the corresponding drive disk.

Because each rotary actuator is coaxially disposed with respect to the corresponding drive disk, the radial dimension of a drive assembly including the drive disk and rotary actuator can be minimized, and this contributes to a compact design of the friction drive device. In particular, if each actuator at least partly overlaps with the drive rollers of the corresponding drive disk along the central axial line thereof, the axial dimension of the assembly can be minimized. According to a certain aspect of the present invention, the prescribed plane of rotation is neither parallel nor perpendicular to the central axial line.

Because the drive assembly can be assembled and handled as an integral assembly, the assembly and maintenance work of the friction drive device can be simplified.

According to a preferred embodiment of the present invention, the friction drive device further comprises a speed reduction unit such as a wave gear device and planetary gear device for transmitting a rotational output of each actuator to the corresponding drive disk at a reduced speed ratio, the actuator, speed reduction unit and drive disk being arranged in a coaxial relationship.

Each drive disk can be rotatably supported by the frame. However, if the two drive disks are connected to each other by a coupling mechanism that couples the two drive disks in a mutually freely rotatable manner while preventing radial and/or axial relative movement between the two drive disks, the two drive disk can be supported more firmly. In particular, the axial offsetting and/or the radial offsetting between the two drive disks can be minimized, and this contributes to an efficient power transmission to the main wheel. Furthermore, the structure for supporting the drive disks can be given with a required rigidity and mechanical strength requiring a minimum amount of material.

According to a particularly preferred embodiment of the present invention, a plurality of slots are formed along a peripheral part of each drive disk, each slot extending along the prescribed plane of rotation, and each drive roller is rotatably supported by the drive disk via a roller shaft passed perpendicularly across the corresponding slot.

Thus, because the drive rollers are directly supported by the drive disks, no additional component parts such as brackets are required, and the number of component parts and amount of assembly (maintenance) work can be minimized.

Minimizing the frictional resistance of the drive rollers is important for achieving a high drive efficiency of the friction drive device. To minimize friction, a roller shaft may be press fitted into each drive roller, and rotatably supported by bearing holes formed in the corresponding drive disk via a bearing bush that may be made of sintered alloy impregnated with lubricant (which may be either liquid or solid). The bearing bush may be provided with a flange that may be interposed between a side surface of each drive roller and an opposing wall surface of the slot. Preferably, a low frictional coating consisting of such material as fluoride resin is formed on at least one of mutually sliding surfaces of each drive roller and an opposing wall surface of the corresponding slot or the flange interposed therebetween.

This friction drive device can be advantageously used as a drive unit for an inverted pendulum type vehicle in which the main wheel is used as a road contact wheel. Each actuator may comprise an electric motor, and the vehicle is provided with a vertically elongated vehicle frame, a battery for powering the electric motor being mounted on an upper part of the vehicle frame, and the drive unit being mounted on a lower part of the vehicle frame. Thereby, a vehicle body of a compact design, and having a small footprint can be achieved.

BRIEF DESCRIPTION OF THE DRAWINGS

Now the present invention is described in the following with reference to the appended drawings, in which:

FIG. 12 is a block diagram of a control system for the vehicle;

FIGS. 13a and 13b are perspective views of the inverted pendulum type vehicle in two different vehicle occupant situations, with the seat assembly deployed for a vehicle occupant to sit thereon and with the seat assembly retracted so that the vehicle occupant may ride the vehicle in a standing posture, respectively;

DETAILED DESCRIPTION OF THE PREFERRED EMBODIMENTS

Figure 1:
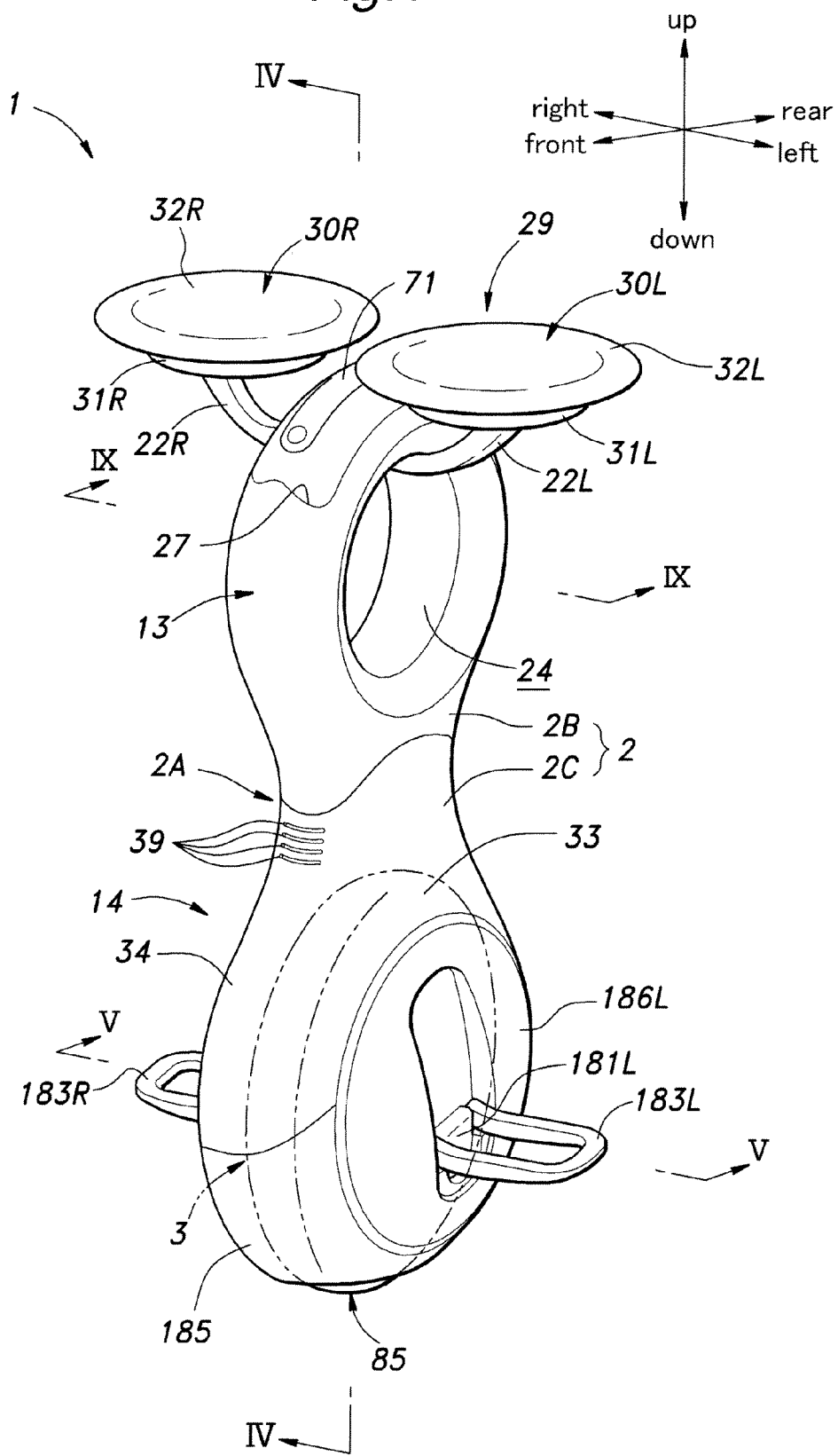
FIG. 1 is a perspective view of an inverted pendulum type vehicle embodying the present invention with a seat assembly deployed for a vehicle occupant to sit thereon and steps deployed for the feet of the vehicle occupant to rest thereon.

The vehicle according to the present invention is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals are also used without the suffix in the following description to denote such components collectively.

Referring to FIGS. 1 to 6, the inverted pendulum type vehicle 1 given as a first embodiment of the present invention comprises a frame 2 elongated in a vertical direction, a drive unit 3 incorporated in a lower part of the frame 2, a seat assembly 29 incorporated in an upper part of the frame 2, an electric unit 11 received in an inner middle part of the frame 2 and a battery unit 10 received in an upper part of the frame 2 to power the drive unit 3 and electric unit 11 as well as various sensors. The electric unit 11 comprises an inverted pendulum control unit 5, an upper load sensor 6 and an inclination sensor 7. The control unit 5 controls the drive unit 3 according to the principle of the inverted pendulum control based on output signals received from various sensors so as to maintain the vehicle 1 in an upright posture. The sensors include a pair of step load sensors 8 and rotary encoders 9.

Figure 3:
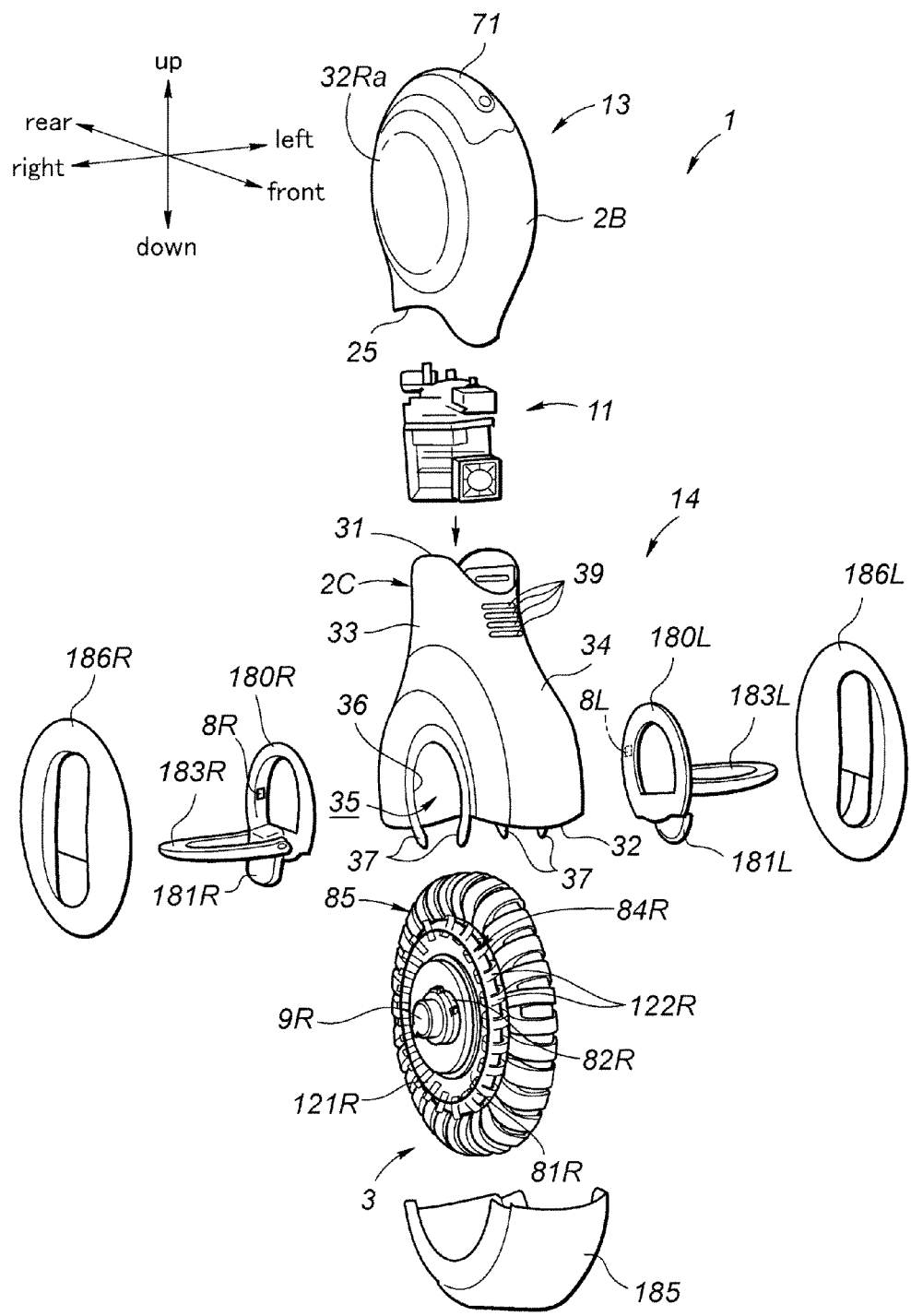
FIG. 3 is an exploded perspective view of the vehicle.

Referring to FIG. 1, the frame 2 is formed as a hollow shell, and have a substantially greater fore and aft dimension than a lateral dimension as seen in a horizontal cross section. The frame 2 includes a narrow section 2A which is narrow as seen from a side, or has a side profile in the shape of numeral "8". The frame 2 is divided into an upper frame 2B and a lower frame 2C at the narrow section 2A as best illustrated in FIG. 3. Each of the upper and lower frames 2B and 2C is made of dry carbon (carbon fiber reinforced plastic material) which is formed by thermally curing carbon pre-impregnated sheets.

The upper frame 2B and lower frame 2C are joined to each other via the upper load sensor 6 which will be described hereinafter.

Figure 4:
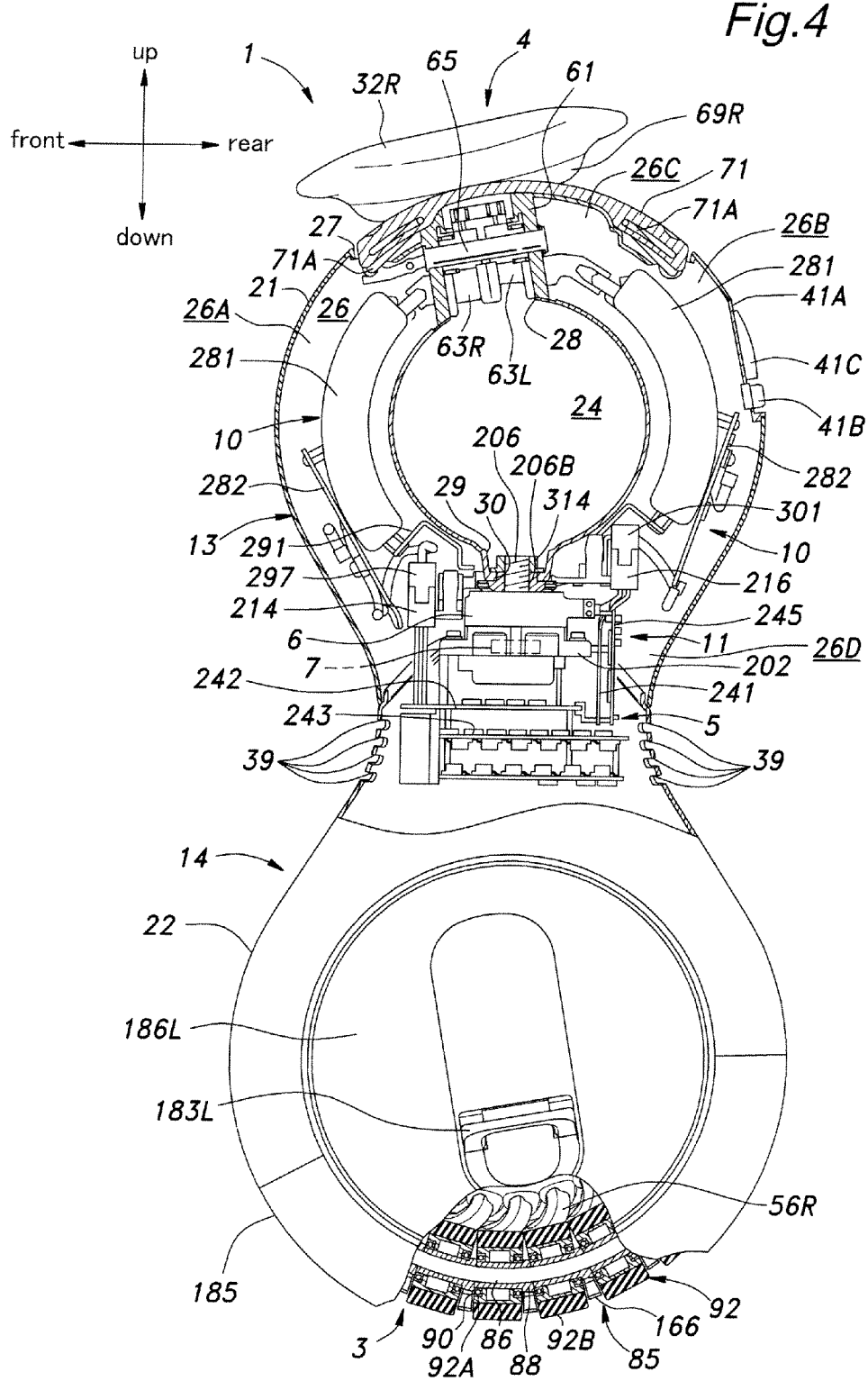
FIG. 4 is a side view of the vehicle mostly in section taken along line IV-IV of FIG. 1.

As shown in FIG. 4, the upper frame 2B is given with an annular shape so as to define a central space or a saddle storage space 24 passed laterally across the upper frame 2B. The hollow interior of the upper frame 2B includes a front space 26A, a rear space 26B, an upper space 26C, and a lower space 26D. The lower end of the upper frame 2B is formed with a lower opening 25 (FIG. 3) facing downward. The upper end of the upper frame 2B is formed with an upper opening 27 communicating the upper space 26C with the exterior of the upper frame 2B. The wall of the upper frame 2B separating the upper space 26C from the saddle storage space 24 is formed with a saddle mounting hole 28. The wall of the upper frame 2B separating the lower space 26D from the saddle storage space 24 is formed with a recess 29 which is recessed downward, and a connecting hole 30 is formed centrally in the bottom wall of the recess 29.

Figure 2:
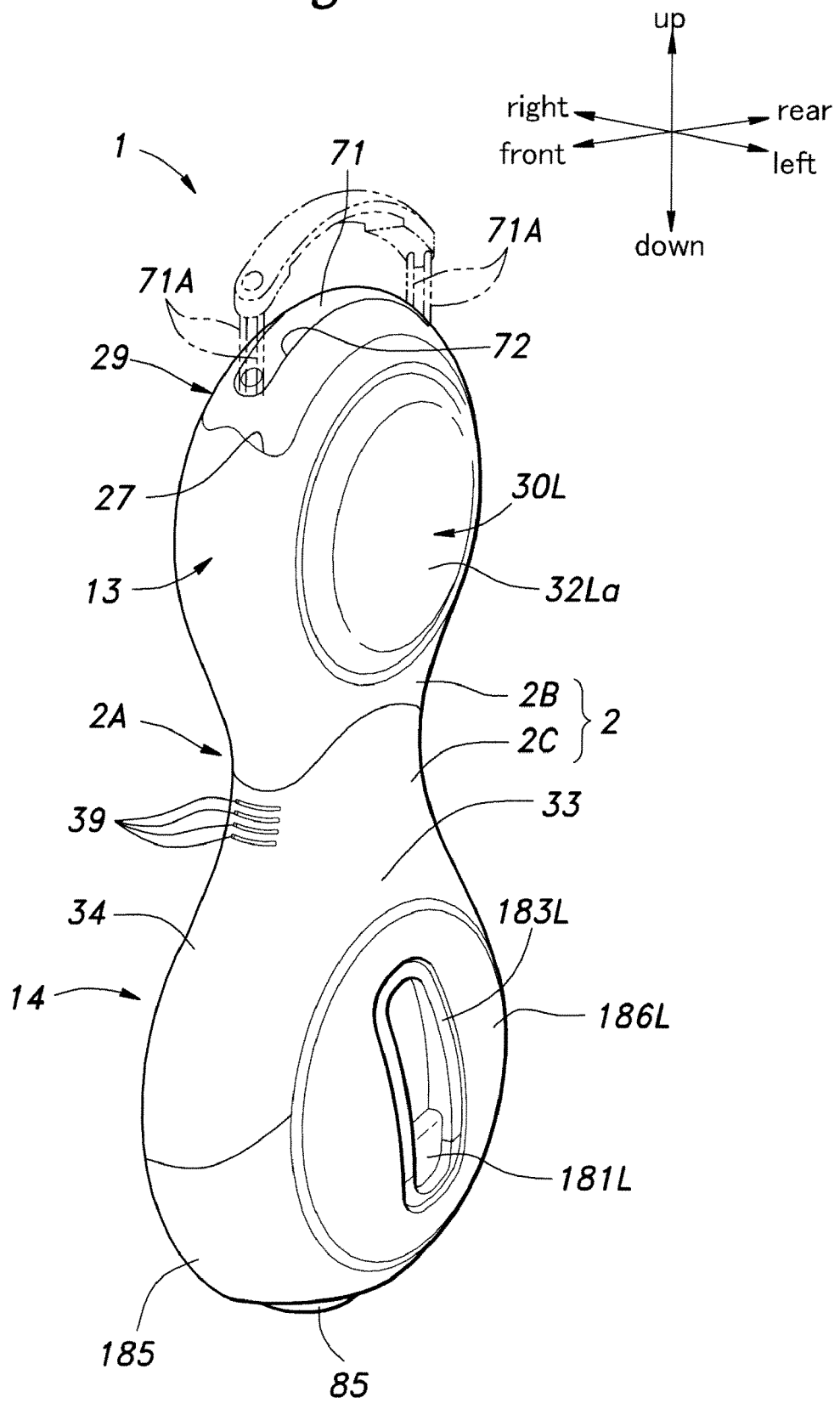
FIG. 2 is a view similar to FIG. 1 showing the vehicle ready to be transported with the seat assembly and steps retracted.

The upper frame 2B thus defines an annular interior, and the battery unit 10 includes a rechargeable battery 281 consisting of a pair of arcuate parts, one received in the front space 26A and the other in the rear space 26B so as to conform to the arcuate form of the corresponding spaces. The seat assembly 29 is received in the saddle storage space 24 passed laterally across the upper frame 2B when retracted as illustrated in FIG. 2. Therefore, the annular shape of the upper frame 2B is conveniently utilized for storing the seat assembly 29 and battery unit 10 in a highly compact manner.

As shown in FIG. 4, to a rear side of the upper frame 2B is secured a switch panel 41A which includes a power switch 41B to turn on and off the main power of the vehicle 1 and a power lamp 41C that lights up when the main power is turned on.

Figure 8:
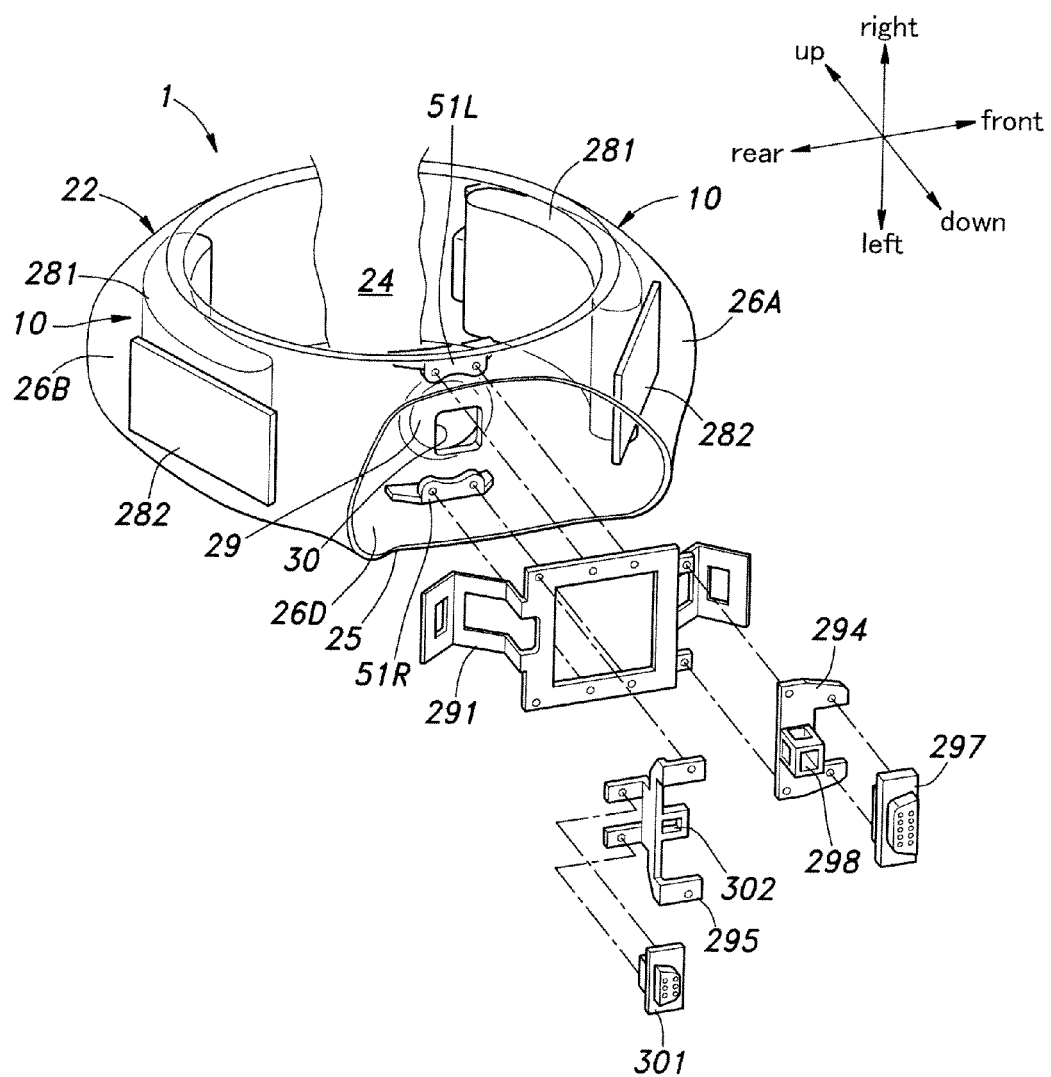
FIG. 8 is an exploded perspective view of an upper structure of the vehicle.

As shown in FIG. 8, to the inner surface of the upper wall of the lower inner space 26D are attached a pair of metallic support bases 51 on either lateral side of the recess 29. Each support base 51 is provided with a horizontal plate section extending in the fore and aft direction, and a pair of threaded holes are formed vertically in the horizontal plate section one behind the other.

As shown in FIG. 3, the lower frame 2C is also made of a hollow shell having an upper opening 31 and a lower opening 32. The lower frame 2C includes a pair of side walls 33 extending vertically in mutually parallel relationship, and is generally elongated in the fore and aft direction. The front and rear walls 34 bulge in forward and rearward directions, respectively, adjacent to lower parts thereof so that a lower part of the lower frame 2C presents a substantially semi-circular side profile. The lower part of the lower frame 2C defines a receiving space 35 for receiving an upper half of the drive unit 3.

The lower edge of each side wall 33 of the upper frame is provided with a semi-circular cutout 36 substantially concentric to the semi-circular side profile of the lower frame 2C. The semi-circular cutouts 36 of the two side walls 33 are conformal and coaxial to each other. Each semi-circular cutout 36 is flanked by a pair of tongue pieces 37 depending therefrom as seen in a side view. The upper part of each of the front and rear walls 34, adjacent to the narrow section 2A of the frame 2, is formed with vent openings 39 which, in this case, consist of a plurality of laterally elongated holes arranged vertically in mutually parallel relationship.

In the vehicle 1 of the illustrated embodiment, because the drive unit 3 and battery unit 10 are arranged in the lower frame 2C and upper frame 2B, respectively, the vehicle 1 may be given with a vertically slender configuration having a small foot print. Furthermore, because the electric unit 11 is placed between the drive unit 3 and battery unit 10 or in the narrow section 2A, the vehicle 1 is given with a highly compact profile.

Referring to FIG. 4, the upper frame 2B forms an upper structure 13 in cooperation with the seat assembly 29 and battery unit 10, and the lower frame 2C forms a lower structure 14 in cooperation with the drive unit 3, electric unit 11 and sensors 8 and 9 (FIGS. 3 and 12). The upper structure 13 can be separated from the lower structure 14 when necessary.

Figure 9:
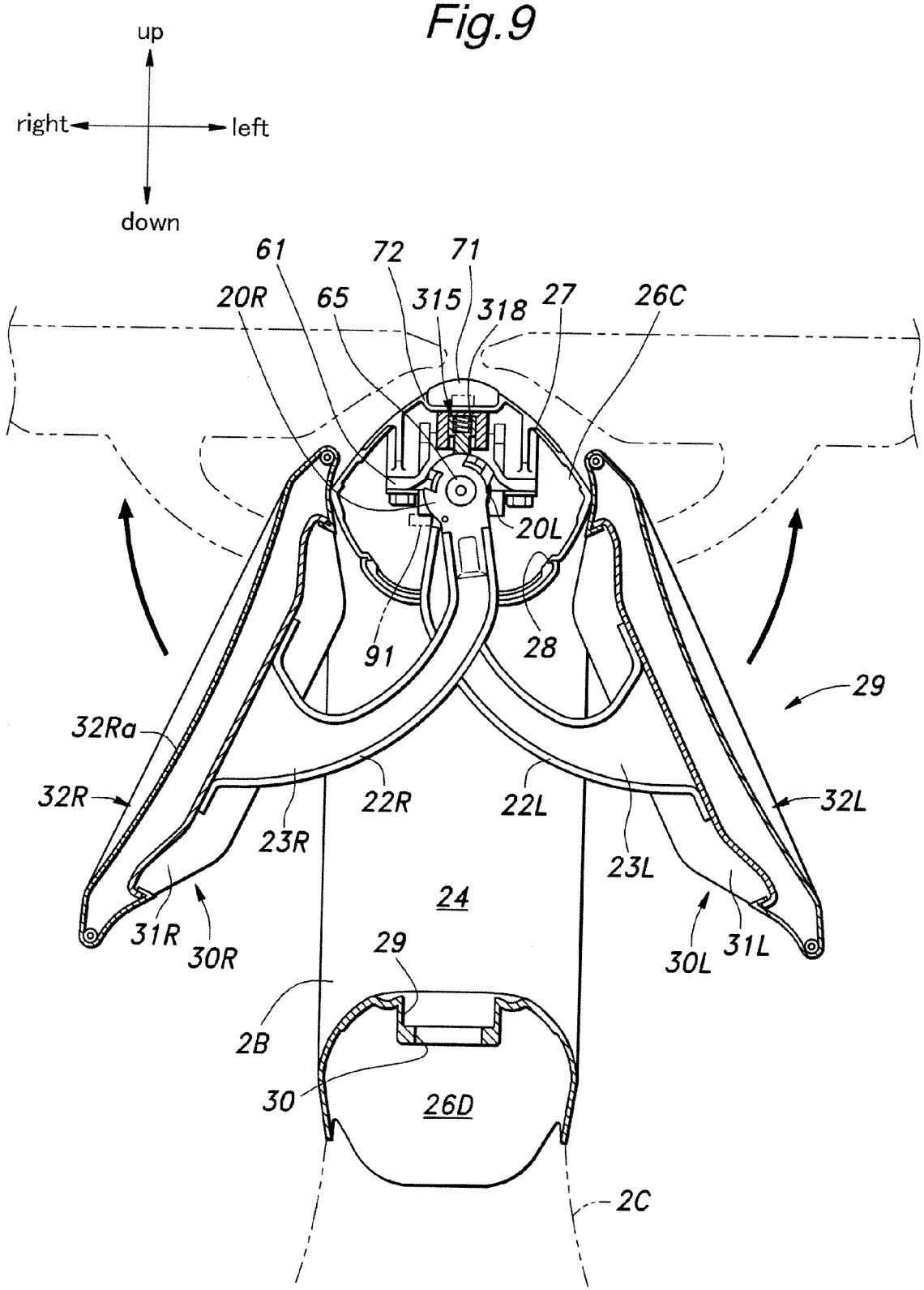
FIG. 9 is a sectional view taken along line IX-IX of FIG. 1.

Referring to FIG. 9, the seat assembly 29 includes a base main body 61, a pair of saddle arms 22 and a pair of saddle members 30. The base main body 61 is installed in the upper space 26C from the upper opening 27, and an upper wall of the base main body 61 closes the upper opening 27. An upper part of the base main body 61 is provided with a support shaft 65 extending in the fore and aft direction.

The support shaft 65 pivotally supports the base ends 20 of the saddle arms 22. Each saddle arm 22 extends from the base end 20 thereof, and is passed through the saddle mounting hole 28. The free end 23 of each saddle arm 22 is therefore located outside of the upper frame 2B. The left saddle arm 22L is rotatable between a retracted position in which the free end 23L thereof is located below the base end 20L thereof or within the saddle storage space 24 and a deployed position (service position) located to the left of the base end 20L thereof. Similarly, the right saddle arm 22R is rotatable between a retracted position in which the free end 23R thereof is located below the base end 23R thereof or within the saddle storage space 24 and a deployed position (service position) located to the right of the base end 20R thereof. Each saddle arm 22 is curved so that the convex side thereof faces downward in the deployed position thereof.

The saddle arms 22 are connected to each other via a link mechanism not shown in the drawings so that one of them may be refracted when the other one is retracted, and deployed when the other one is deployed in unison. The base main body 61 is provided with a lock member (not shown in the drawings) which is selectively engaged by an engagement hole provided in each of the saddle arms 22 so that the saddle arms 22 may be fixed at each of the retracted position and deployed position as required.

The free end 23 of each saddle arm 22 is fitted with a saddle member 30 that includes a support portion 31 by which the saddle member 30 is connected to the saddle arm 22 and a disk shaped cushion pad 32 supported by the support portion 31. Each cushion pad 32 defines a seat surface 32a, on a side thereof opposite from the support portion 31, for supporting a buttock of a vehicle occupant. When the saddle arms 22 are in the deployed position as indicated by the double-dot chain-dot line in FIG. 9, the cushion pad 32 is placed above the support portion 69, and defines an upwardly directed seat surface. The load of the vehicle occupant D in the sitting posture (see FIG. 13a) is applied to the upper frame 2B via the saddle member 30, saddle arm 22 and base main body 61.

When the saddle arms 22 are in the retracted position, the support portions 31 of the saddle members 30 are received within the saddle storage space 24 and the cushion pads 32 close the respective sides of the saddle storage space 24 so that the upper frame 2B presents a smooth side contour.

The structure of the seat assembly 29 for the vehicle 1 is not limited to the one used in the illustrated embodiment, but may also be given with different configurations, for instance for supporting a cargo. In such a case, the shape of the saddle 30 may be modified to suit the particular cargo to be transported by the vehicle 1.

The upper wall of the base main body 61 is fitted with a retractable grip handle 71 that can be used for lifting and carrying the vehicle 1 by the user, much like a grip handle of a suitcase. When not in use, the grip handle 71 may be received in a handle receiving recess 72 formed in the upper wall of the base main body 61 as indicated by the solid lines in FIG. 2. When in use, the grip handle 71 is raised above the base main body 61, and connected to the base main body 61 via a pair of legs 71A as indicated by the imaginary lines in FIG. 2. Each leg 71A includes a base end pivotally connected to the base main body 61 and a free end pivotally connected to the grip handle 71 via a slot formed in the grip handle 71. Therefore, when the vehicle is powered off, the user can lift and carry the vehicle 1 or maintain the vehicle in the upright posture by holding the grip handle 71.

As shown in FIGS. 4 to 7, the drive unit 3 comprises a pair of symmetrically opposing drive assemblies 40 received in a space defined between the side walls 33 of the lower frame 2C. Each drive assembly 40 comprises a mount member 42 fixedly attached to the lower frame 2C, in particular the corresponding side wall 33 thereof, an electric motor 64 mounted on the mount member 42, a wave gear device 72 for reducing the rotational speed of the output shaft of the motor 64, and a drive disk 48 rotatively actuated by the electric motor 64 via the wave gear device 72. Thus, the rotational output of the electric motor 64 is transmitted to the drive disk 48 at a reduced speed. The drive unit 3 further comprises a main wheel 85 interposed between the two drive assemblies 40, and rotatively actuated by the two drive assemblies 40. The two mount members 42 are provided with a common central axial line A extending in the lateral direction, and are thus coaxially attached to the lower frame 2C.

Each mount member 42 is provided with a cylindrical portion 421, a radial external flange formed in an outer end of the cylindrical portion 421 and a radial internal flange formed in an inner end of the cylindrical portion 421. An annular drive disk 48 is rotatably supported by the outer circumferential surface of the cylindrical portion 421 of the mount member 42 via a crossed roller bearing 46 which is configured to support both a radial load and an axial (thrust) load. The crossed roller bearing 46 is kept immobile in the axial direction by fastening rings 50 and 52 threaded onto the drive disk 48 and mount member 42, respectively.

The drive disk 48 is provided with an outer annular portion 482 having a greater inner circumference than the outer circumference of the cylindrical portion 421 of the mount member 42. A plurality of drive rollers 56 are rotatably mounted on the outer periphery of the outer annular portion 482 via respective roller shafts 54 at a regular circumferential interval. Each drive roller 56 may be made of relatively rigid material such as metallic and plastic materials.

Figure 7:
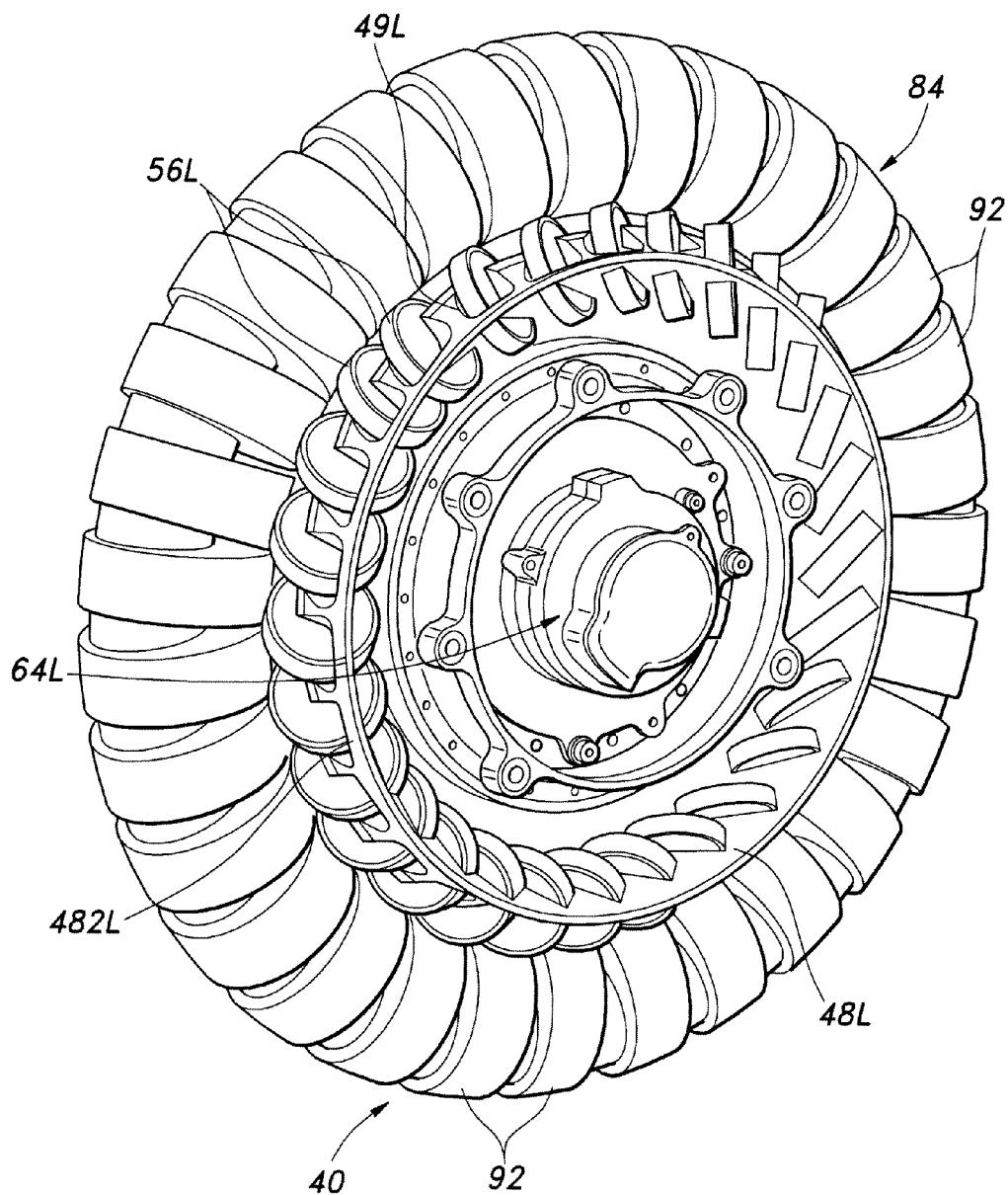
FIG. 7 is a perspective view of an essential part of the frictional drive device or the drive unit.

The axial lines of the roller shafts 54 are disposed such that the planes of rotation of the drive rollers 56 are each disposed neither in parallel to nor perpendicular to the axial center line (center of rotation) A of the drive disk 48 as best illustrated in FIG. 7. The positional relationship of the drive rollers 56 on the drive disk 48 may be similar to the gear teeth of a helical bevel gear of a prescribed cone angle. For more detailed description of the drive unit, see WO2008/139740A (US20100096905A1). The roller shafts 54 are positioned such that the outer periphery of each drive roller 56 is located radially more outward than the outer periphery of the outer annular portion 482.

Figure 14:
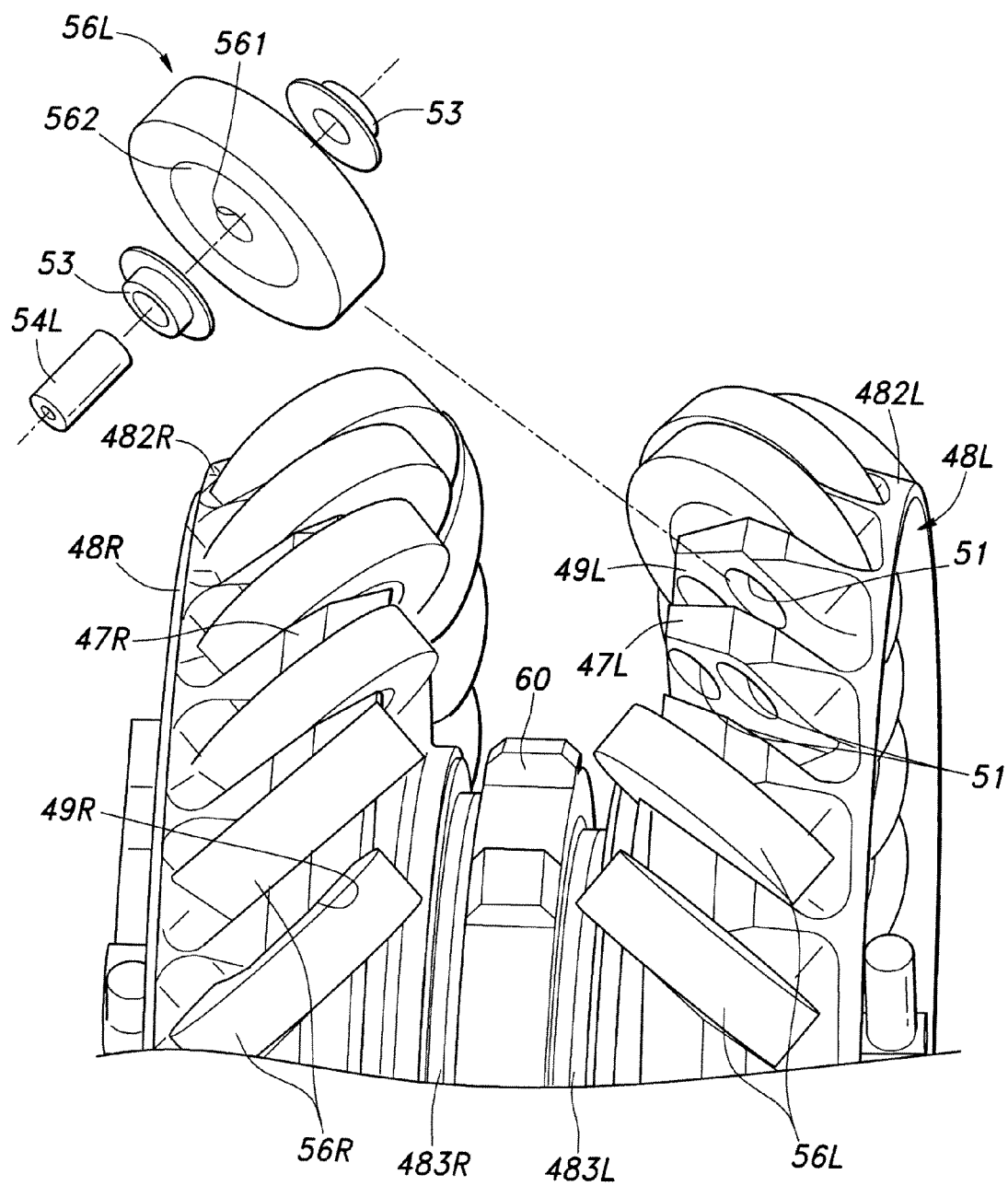
FIG. 14 is an enlarged exploded perspective view of the structure for mounting the drive rollers.

As shown in FIG. 14, on the outer periphery of each drive disk 48 are formed a plurality of slots 49 each flanked by a pair of wall members 47 and extending along a plane which is neither parallel nor perpendicular to the central axial line of the drive disk 48 at a regular circumferential interval. These slots 49 may be formed by using a milling machine while the drive disk 48 is appropriately index around the central axial line thereof.

In the illustrated embodiment, the drive disks 48 are prepared by machining metallic material, but may also be made of other materials such as cast metallic material and molded plastic material.

Figure 15:
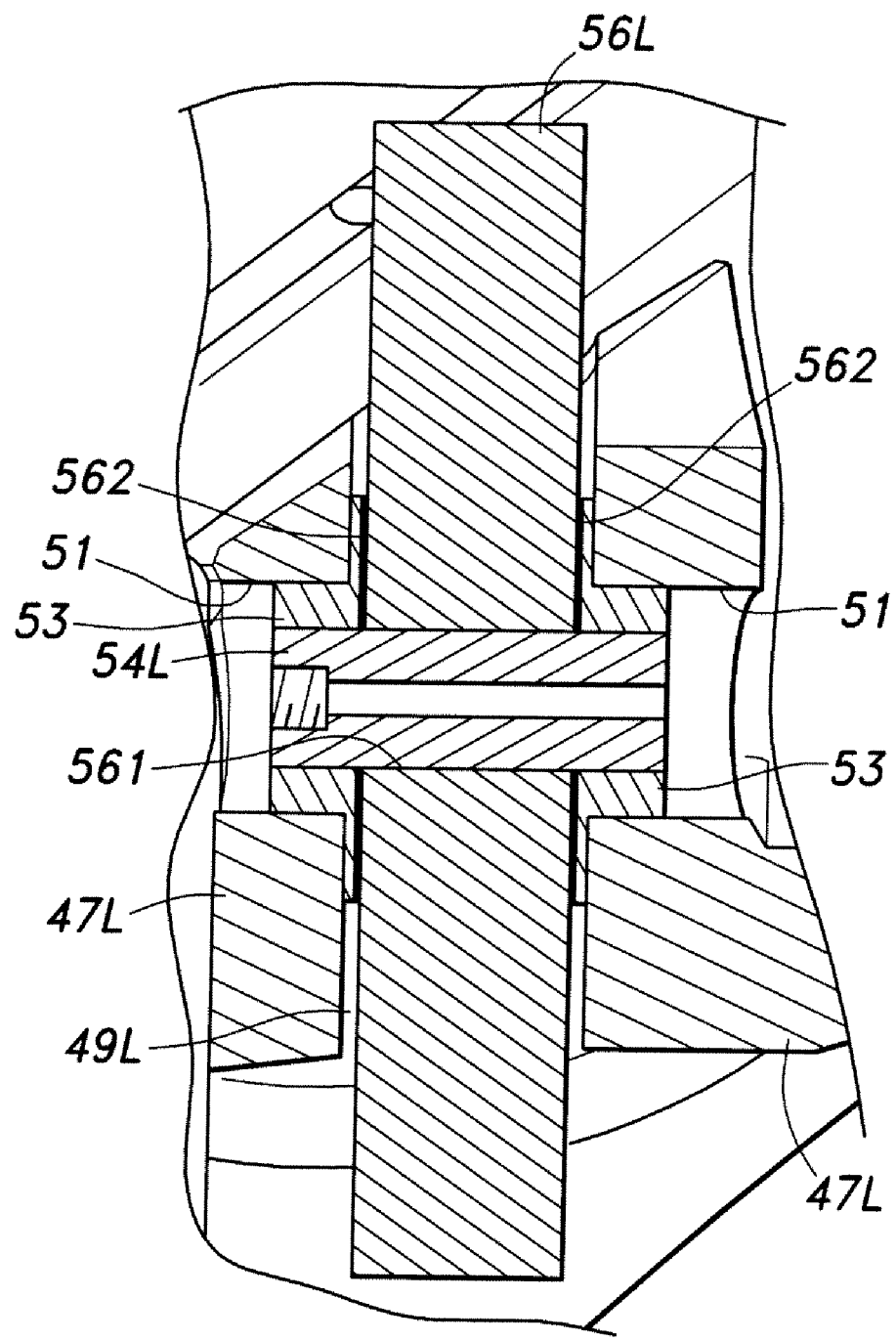
FIG. 15 is an enlarged sectional view of the structure for mounting the drive rollers.

As shown in FIGS. 14 and 15, in the illustrated embodiment, the wall members 47 in the peripheral part of the drive disk 48 are each formed with a pair bearing holes 51 that open out into the slots 49 from a perpendicular direction. Each roller shaft 54 is passed into one of the bearing holes 51 opening out to the corresponding slot 49, press fitted into a central hole 561 of the corresponding drive roller 56, and is passed into the other bearing hole 51 facing the slot 49. A flanged bush 53 is interposed between the roller shaft 54 and each bearing hole 51. A radial external flange of the flanged bush 53 is interposed between each end surface of each drive roller 56 and opposing surface of the wall member 47 of the drive disk 48 defining the slot 49.

By directly forming the bearing holes 51 in the material of the drive disk 48, the axial direction of each drive roller 56 can be determined at a high precision. Also, the need for special brackets or any intermediate members is eliminated, and this contributes to the improvement in the assembling precision and simplification of the assembling process. The position of each bearing hole 51 is determined such that the roller shaft 54 may be passed thereinto without being interfered by the presence of the adjacent wall member 47.

Each flanged bush 53 is made of sintered alloy impregnated with solid lubricant so that the roller shafts 54 may be supported by the bearing holes 51 with a minimum amount of friction. The flange of each flanged bush 53 eliminates a play between the opposing surfaces of the drive roller 56 and wall member 47. The sliding surfaces of the flange of each flanged bush 53 may be coated with a surface layer 562 consisting of fluoride resin or any other suitable friction material. This, combined with the use of the sintered alloy impregnated with solid lubricant for the flanged bush 53, ensures a low friction rotation of the drive rollers 56.

In the illustrated embodiment, the drive rollers 56 and wall members 47 alternate each other along the periphery of the drive disk 48. The width of each drive roller 56 may have a substantially same width as that of each wall member 47. As each wall member 47 is required to support two of the roller shafts 54 supporting the adjoining drive rollers 56, a pair of bearing holes 51 are formed in each wall member 47. Thus, the drive rollers 56 can be rotatably supported in a prescribed geometrical relationship in a highly simple arrangement. Also, the drive rollers 56 can be arranged at a high density, and this contributes to an increase in the performance of the vehicle.

The drive disks 48 are each provided with a cylindrical extension 483 protruding therefrom toward the other drive disk 48 in a coaxial relationship. The two mutually opposing cylindrical extensions 483 of the drive disks 48 have different diameters so as to be nested each other, and support each other via a crossed roller bearing 58 interposed between the outer circumferential surface of the cylindrical extension 483L of the left drive disk 48L and the inner circumferential surface of the cylindrical extensions 483R of the right drive disk 48R. The crossed roller bearing 58 is configured to support both a radial load and an axial (thrust) load. The crossed roller bearing 58 is kept immobile in the axial direction by fastening rings 60 and 62 threaded onto the cylindrical extensions 483, respectively.

The crossed roller bearing 58 joins the two drive disks 48 together in a mutually rotatable manner, and prevents radial and axial offsetting between the two drive disks 48. In other words, the crossed roller bearing 58 joins the two drive disks 48 together in a mutually rotatable but axially fast manner. Thereby, the coaxial relationship between the two drive disks 48 is maintained, and the axial distance between the two drive disks 48 is kept fixed.

A cylindrical space 484 defined centrally in the cylindrical potion 481 of the drive disk 48 receives the electric motor 64 in a coaxial relationship. The electric motor 64 includes an outer housing 66 receiving stator coils (not shown in the drawings) and fixedly attached to the mount member 42 by using threaded bolts 68. The electric motor 64 is provided with a rotor shaft 70 projecting toward the other electric motor 64.

The electric motor 64 at least partly overlaps with the drive disk 48 or in particular the drive rollers 56 of the drive disk 48 with respect to the axial line A. In other words, in a projected plane containing the central axial line A, the electric motor 64 at least partly overlaps with the corresponding drive disk 48 or in particular drive rollers 56 of the corresponding drive disk 48.

The free end of the rotor shaft 70 is fixedly connected to a wave plug 74 of the wave gear device 72 which is of a per se known type. The wave gear device 72 is coaxially disposed with respect to the electric motor 64, and includes, in addition to the wave plug 74 having an elliptic profile and serving as an input member, a wave bearing 76 fitted on the outer circumferential surface of the wave plug 74, a flexible external teeth member 78 consisting of a flanged cylindrical thin shell which frictionally engages the outer circumferential surface of the wave bearing 76 and is provided with external teeth on the outer circumferential surface thereof, and a high-stiffness internal teeth member 80 having internal teeth meshing with the external teeth of the external teeth member 78 on the inner circumferential surface thereof. The internal teeth member 80 serves as the output member of the wave gear device 72, and is fixedly secured to the drive disk 48 by using threaded bolts 82.

Thus, the rotational output of the electric motor 64 is reduced in speed by the wave gear device 72, and is individually transmitted to the corresponding drive disk 48.

In the illustrated embodiment, the wave plug 74, wave bearing 76, and internal gear member are at least mostly received within the internal space of the cylindrical extension 483 of the drive disk 48. This, combined with the placement of the electric motor 64 within the cylindrical portion 481 of the drive disk 48, the axial dimension of each drive assembly and hence the axial dimension of the drive unit 3 can be minimized.

The main wheel 85 is interposed and held between the two sets of drive rollers 56 of drive disks 48 which are each arranged in an annular pattern so as to be supported exactly or approximately upon the central axial line A of the main wheel 85. In other words, the main wheel 85 is not provided with a central shaft on the central axial line A, but can rotate around the central axial line A.

The main wheel 85 comprises an annular member 86 made of a ring having a polygonal cross section, a plurality of inner sleeves 88 fixedly fitted on the annular member 86 at a regular interval and a driven roller 92 rotatable supported by the outer circumferential surface of each sleeve 88 via a ball bearing 90. The driven rollers 92 are configured to engage a floor surface, and may each consist of a metal cylinder 92A fitted on the outer race of the ball bearing 90 and a rubber cylinder 92B integrally vulcanized onto the outer circumferential surface of the metal cylinder 92A.

The driven rollers 56 along with the associated inner sleeves 92 are arranged circumferentially along the entire circumference of the annular member 86, and the driven rollers 56 are each freely rotatable around the axial line thereof which is tangential to the corresponding position of the annular member 86. A disk shaped cover 166 (see FIG. 4) is interposed between each adjacent pair of driven rollers 56 so as to close the wedge shaped gap between the adjacent driven rollers 56 and thereby keep foreign matter from intruding into the ball bearings 90.

In the illustrated embodiment, the mode of rotation of the main wheel 85 and rotation of the driven roller 92 is determined by the modes of rotation of the two drive disks 48L and 48R. When the two drive disks 48L and 48R are rotated at a same speed in a same direction, the main wheel 85 rotates circumferentially or around the central axial line while the driven rollers 164 do not rotate around the respective axial lines so that the vehicle travels either in the forward or rearward direction depending on the rotational direction of the drive disks 48L and 48R.

When the two drive disks 48L and 48R are rotated at a same speed in opposite directions, the main wheel 85 remains stationary while the driven rollers 92 rotate around the respective axial lines so that the vehicle travels sideways depending on the rotational directions of the drive disks 48L and 48R.

When the two drive disks 48L and 48R are rotated at mutually different speeds, the main wheel 85 is rotated around the central axial line A at a speed corresponding to the average of the rotational speeds of the two drive disks 48L and 48R, and the drive rollers 164 are rotated around their respective axial lines at a speed corresponding to the difference between the rotational speeds of the two drive disks 48L and 48R.

Therefore, by suitably selecting the rotational speeds of the two drive disks 48L and 48R, the vehicle 1 is allowed to travel in any desired direction given as a composition of a fore-and-aft movement and a lateral movement. In particular, because at least those driven rollers 92 contacting the road surface in a lower part of the main wheel 85 are engaged by the driven rollers 56 of the two assemblies 40, the vehicle is enabled to produce a propulsive force at all times.

In the illustrated embodiment, because the drive unit 3 is formed as a combination of the main wheel 85 and the pair of drive assemblies 40 which are substantially mirror images of each other, the assembly and maintenance work can be easily and efficiently carried out. First of all, each drive assembly and the main wheel are individually assembled, and the main wheel 85 can be combined with the two drive assemblies 40. In particular, when the drive disks 48 are joined to each other by using a crossed roller bearing 58 as in the illustrated embodiment, the handling of the overall drive unit 3 can be simplified. Also, owing to the coaxial and nested arrangement of the electric motor with respect to the drive disk and mount member, the electric motor does not radially or axial protrude from the profile of each drive assembly, and this enables a highly compact design of the drive unit.

Figure 5:
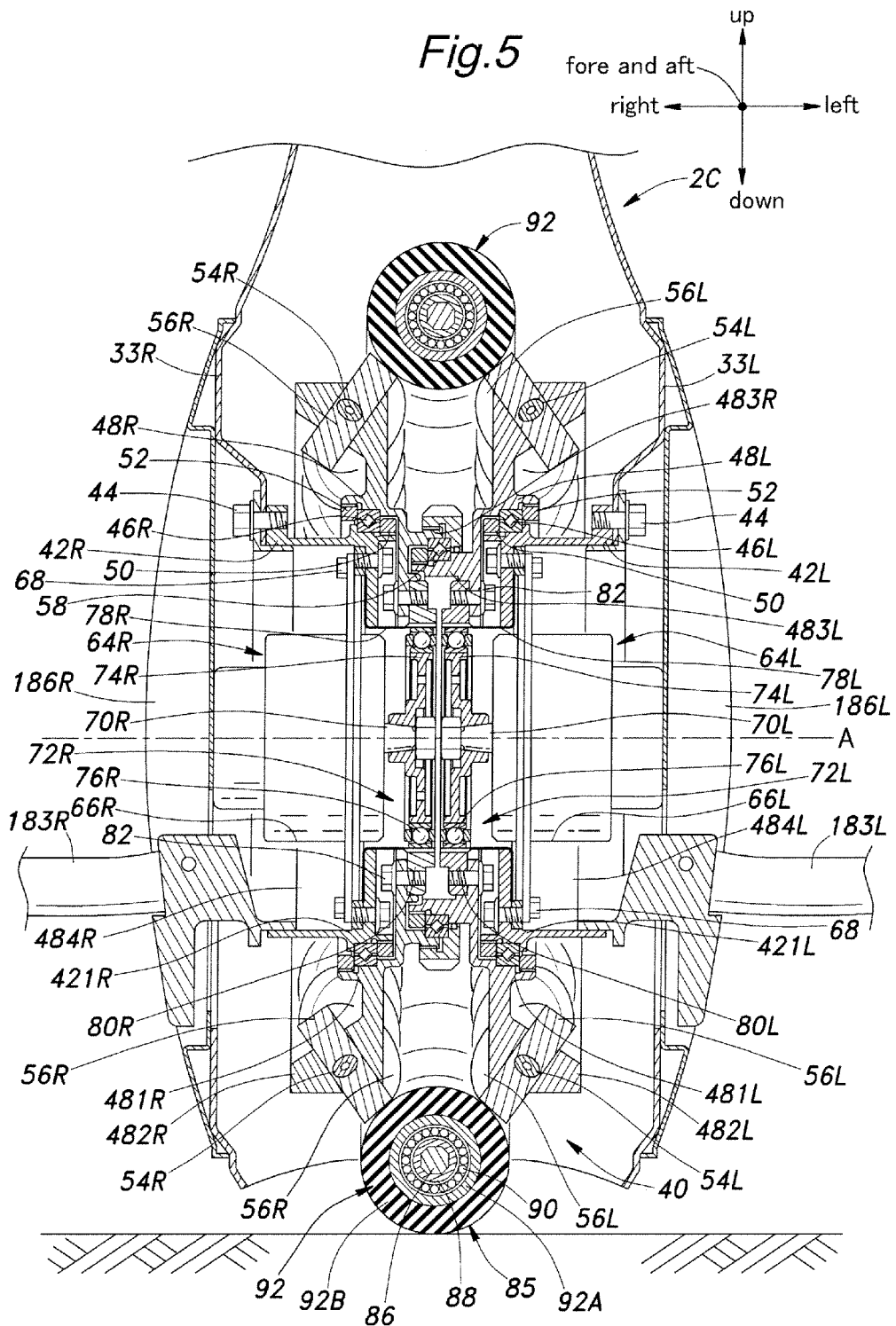
FIG. 5 is a sectional view of a lower part of the vehicle taken along line V-V of FIG. 1.
Figure 6:
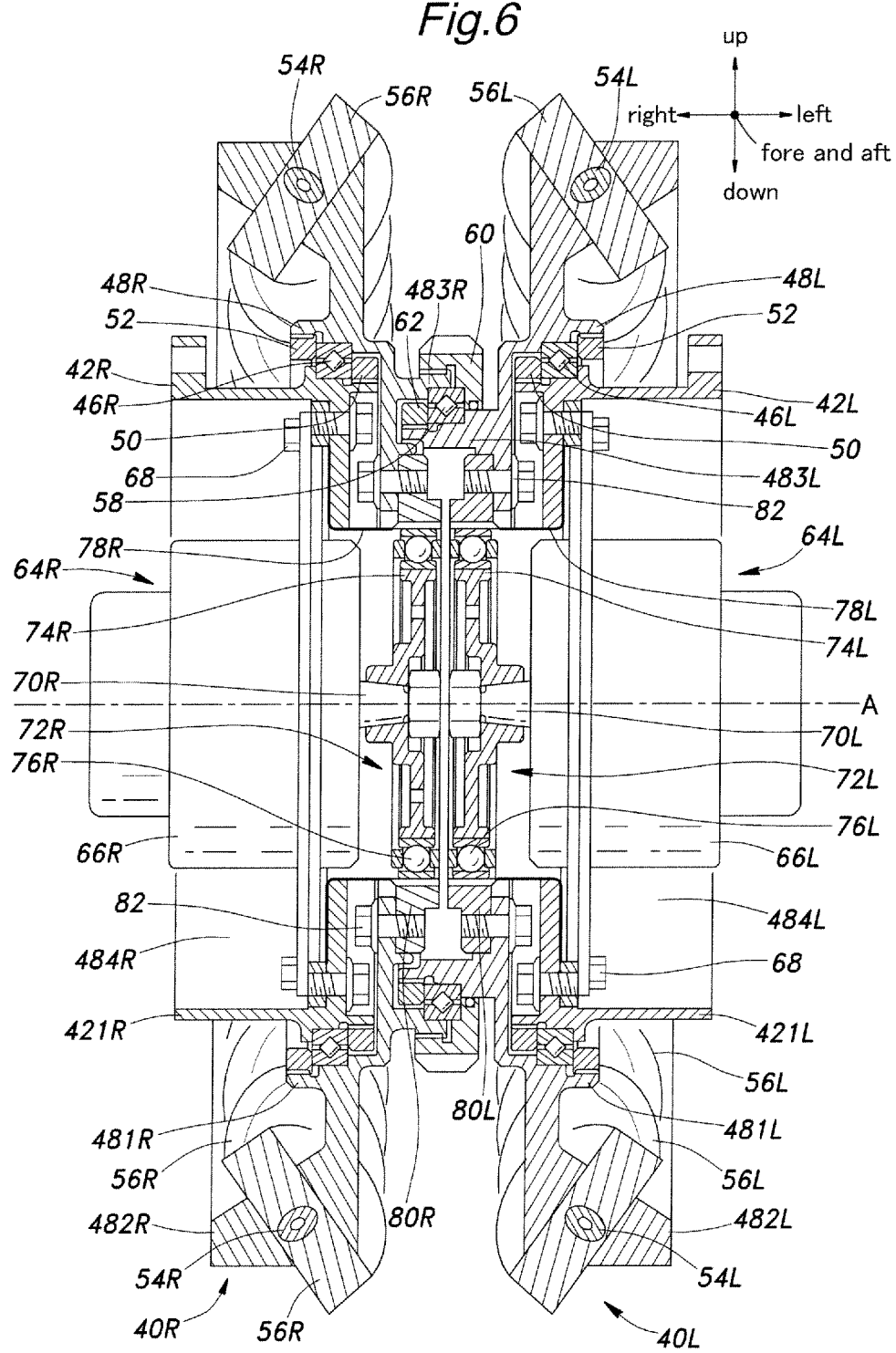
FIG. 6 is an enlarged sectional view of the frictional drive device used in the vehicle.

The arrangement for attaching the drive unit 3 to the lower frame 2C is described in the following. As shown in FIG. 3, the upper half of the drive unit 3 is received in the receiving space 35 of the lower frame 2C such that the axial line thereof is directed laterally with respect to the frame 2. As shown in FIG. 5, the radial external flange of each mount member 42 of the drive unit 3 engages the peripheral edge of the cutout 36 in the side wall 33 of the lower frame 2C and the inner surface of the tongue piece 37.

As shown in FIG. 3, a step base 180 is attached to the outer surface of each side wall 33 of the lower frame 2C. The step base 180 consists of a metallic annular member having an outer profile conforming to those of the cutout 36 and tongue piece 37. The radial external flange of each mount member 42 is formed with threaded holes, and corresponding through holes are formed in the peripheral part of the cutout 36 and tongue piece 37 so that the peripheral part of the cutout 36 and tongue piece 37 are firmly interposed between the step base 180 and radial external flange by passing threaded bolts into the through holes and threading them into the threaded holes of the radial external flange of each mount member 42. Thus, the two step bases 180 and the drive unit 3 are jointly attached to the lower frame 2C.

As shown in FIG. 5, the lower part of the step base 180 is provided with an axial flange that is passed into the space defined between the two tongue pieces 37, and closely received by the inner circumferential surface of the mount member 42. The step base 180 is provided with a lower extension 181 having a base end including an upper part extending axially outward and a lower part generally depending therefrom. The base end of the lower extension 181 rotatably supports a base end of a step 183 via a pivot shaft extending in the fore and aft direction. The step 183 is rotatable between a retracted position extending upward along a side of the lower frame 2C and a deployed position extending laterally outward.

As shown in FIG. 3, a step load sensor 8 is attached to an outer surface of the step base 180. The load sensor 8 may consist of a per se know strain gauge configured to detect strain in the step base 180 when the step 183 is subjected to an external load typically consisting of a load applied by a foot of the vehicle occupant.

As shown in FIGS. 1 to 5, the lower end of the lower frame 2C is provided with a lower cover 185 which conceals the lower half of the drive unit 3 except for the ground contact area of the main wheel 85. To an outer side of each side wall 33 of the lower frame 2C is attached a side cover 186 which conceals the step base 180, but is provided with an opening to allow the step 183 to extend laterally and be raised upward and the lower extension 181 to be externally exposed.

Figure 10:
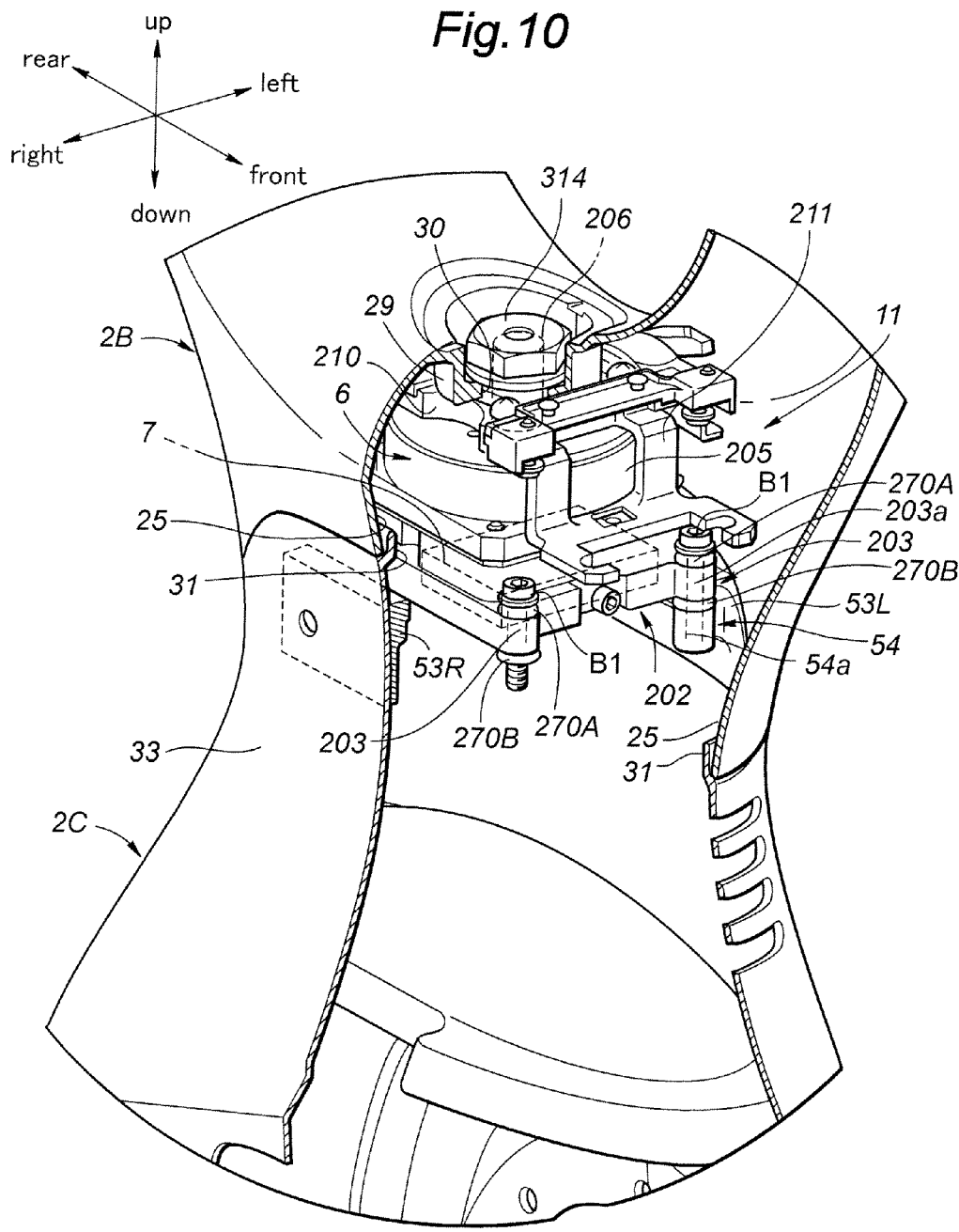
FIG. 10 is a fragmentary partly broken away perspective view of a narrow section of the vehicle.
Figure 11:
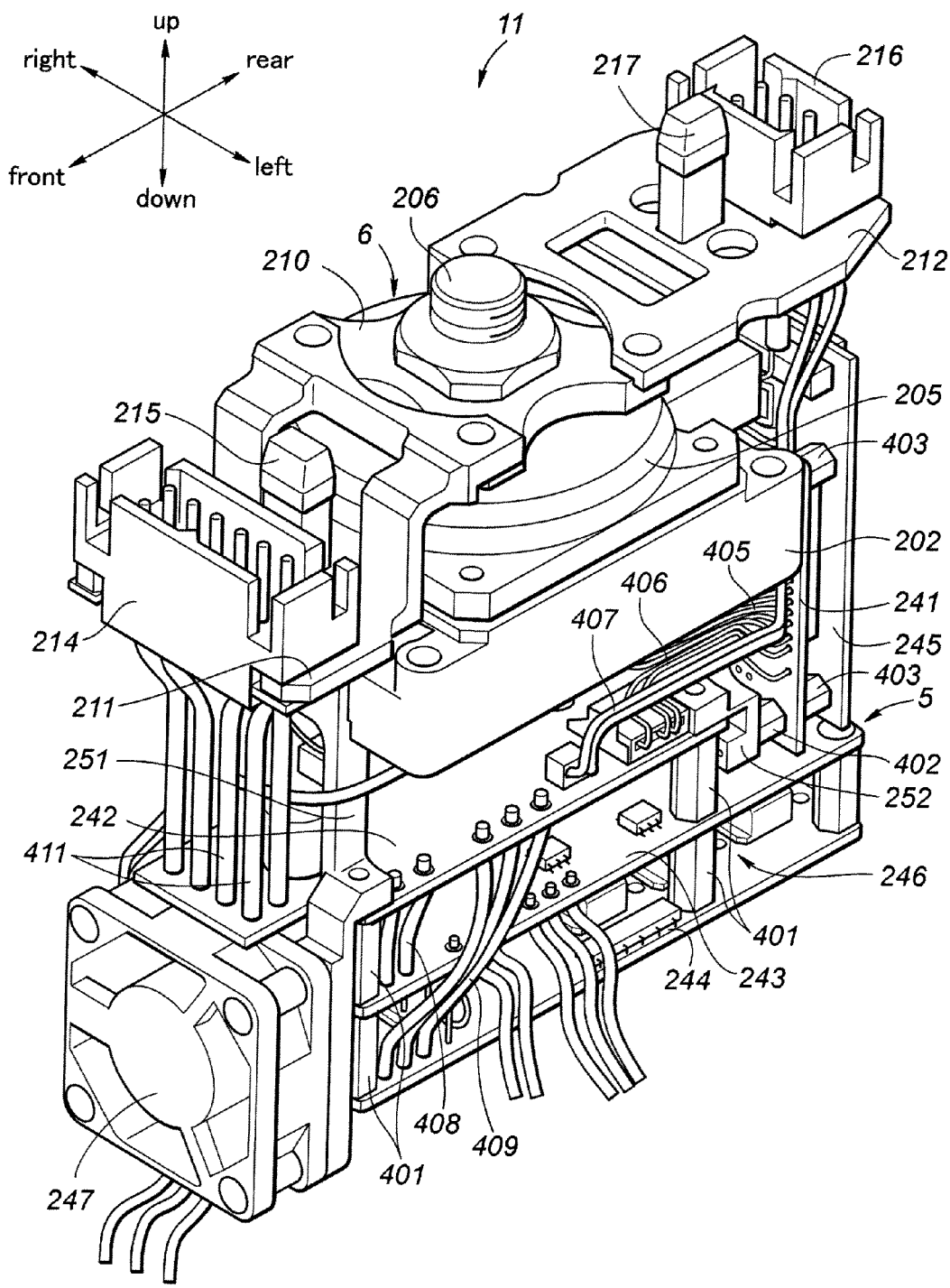
FIG. 11 is a perspective view of an electric unit of the vehicle.

Referring to FIGS. 10 and 11, the various components of the electric unit 11 such as the control unit 5, upper load sensor 6 and inclination sensor 7 are fixedly attached to an electric mount frame 202.

A shown in FIG. 10, to the inner surface of an upper end of each side wall 33, adjacent to the upper opening 31, is fixedly attached a metallic support base 53 which includes a horizontal plate section extending in the fore and aft direction, and a pair of threaded holes 54a are formed in the support portions 54 provided in the horizontal plate section one behind the other.

The electric mount frame 202 essentially consists of a rectangular planar member defining a rectangular central opening, and rests upon the support bases 53 along the side edges thereof. Each side edge of the electric mount frame 202 is provided with a pair of mounting portions 203 formed with through holes 203a so as to correspond to the threaded holes 54a of the support bases 53.

The upper load sensor 6 consists of a tri-axial force sensor that can detect moments around the z-axis (vertical direction), x-axis (for and aft direction) and y-axis (lateral direction), and includes a body portion 205 receiving a sensor circuit board (not shown in the drawings) and fixedly attached to the upper surface of the electric mount frame 202 by threaded bolts, and an input shaft 206 extending upward from the body portion 205 and formed with a male thread along the length thereof.

As illustrated in FIGS. 4, 10 and 11, the body portion 205 is mounted on the electric mount frame 202, and fixedly secured thereto by using threaded bolts. The output shaft 206 is threaded into a threaded central opening of a planar connecting member base 210, and a free end of the output shaft 206 projects upward from the connecting member base 210. A nut 314 is threaded onto to the part of the output shaft 206 protruding upward from the connecting member base 210.

Referring to FIG. 11, the first connector base 211 is attached to a front part of the connecting member base 210 by using threaded bolts, and extends forward. A first connector 214 which is electrically connected to the wiring from a power source circuit board 242 (which will be described hereinafter) is secured to the first connector base 211 by using threaded bolts. The first connector base 211 is provided with a first guide pin 215 extending upward.

A second base 212 is attached to a rear part of the connecting member base 210 by using threaded bolts, and extends rearward. A second connector 216 which is electrically connected to the wiring from a control circuit board 241 (which will be described hereinafter) is secured to the second connector base 212 by using threaded bolts. The second connector base 216 is provided with a second guide pin 217 extending upward.

Referring to FIG. 10, the inclination sensor 7, which may consist of a per se known gyro sensor, is passed downward inside the electric mount frame 202, and fixedly secured thereto by using threaded bolts. The inclination sensor 7 is configured to detect an inclination angle thereof relative to a plumb vertical direction.

As shown in FIG. 11, the control unit 5 includes, in addition to the control circuit board 241 and power source circuit board 242, a left motor driver circuit board 243, a right motor driver circuit board 244, an I/O interface circuit board 245 and a blower fan 247.

The control circuit board 241 includes a control circuit 261 (FIG. 12) which is incorporated with a CPU formed by a microcomputer, and used for controlling the electric motors 82 and other components. The control circuit board 241 is mounted on a rear side of the electric mount frame 202 via a spacer so as to extend both vertically and laterally (or with the major surface thereof facing in the fore and aft direction). The lower part of the control circuit board 241 extends downward well beyond the lower side of the electric mount frame 202 or the housing of the inclination sensor 7. Thus, the length of the signal lines 405 between the control circuit board 241 and the inclination sensor 7, and the lengths of the power lines 406 and signal lines 407 between the control circuit board 241 and power circuit board 242 can be minimized, and this also contributes to the compact design.

The power source circuit board 242 includes a power control circuit (not shown in the drawings) for converting the voltage of the power supplied by the battery unit 10 to a prescribed voltage. The power source circuit board 242 extends both laterally and in the fore and aft direction (or with the major surface thereof facing vertically), and is fixedly attached thereto via a first connecting member 251 extending downward from the front end of the electric mount frame 202. The rear end of the power source circuit board 242 is connected to the lower end of the control circuit board 241 via a second connecting member 252 and a spacer 402. Thus, the length of power lines 408 between the power source circuit board 242 and left motor drive circuit board 243, and the length of power lines 409 between the power source circuit board 242 and right motor drive circuit board 244 can be minimized, and this also contributes to the compact design.

The left motor driver circuit board 243 and right motor driver circuit board 244 include a left motor driver circuit (inverter circuit) 253 and a right motor driver circuit (inverter circuit) 254 used for the PWM control of the left and right electric motors 82L and 82R, respectively (see FIG. 12). The left motor driver circuit board 243 is fixedly attached to the electric mount frame 202 via a spacer 401 and the connecting member 252 below the power source circuit board 242 in parallel thereto. The right motor driver circuit board 244 is fixedly attached to the electric mount frame 202 via a spacer 401, the left motor driver circuit board 243 and the connecting member 252 below the left motor driver circuit board 243 in parallel thereto. Thereby, an air flow passage 246 extending in the fore and aft direction is defined between the left motor driver circuit board 243 and right motor driver circuit board 244.

The I/O interface circuit board 245 includes an input interface circuit 265 and an output interface circuit 266 (see FIG. 12), and is fixedly attached to the electric mount frame 202 via a spacer 403 behind the control circuit board 241 in parallel thereto. The I/O interface circuit board 245 extends both vertically and laterally behind the control circuit board 241 which is in turn located behind the rear end of the power source circuit board 242.

The blower fan 247 consisting of an axial flow fan is connected to the lower end of the first connecting member 251 so as to face the space or the flow passage 245 between the left motor driver circuit board 243 and right motor driver circuit board 244, and forwards an air flow into the space.

The load sensor 6, inclination sensor 7, power source circuit board 7, left motor drive circuit board 243 and right motor drive circuit board 244 are arranged one above the other, and are joined integrally to one another in the electric unit 11. This also contributes not only to the compact design but also to efficient cooling of various components. Furthermore, the electric unit 11 can be readily exposed for easy access by separating the upper and lower frames 2B and 2C from each other, and this facilitates the servicing of the vehicle 1.

The structure for securing the electric unit 11 to the lower frame 2C is described in the following. As shown in FIG. 10, each through hole 203a of the electric mount frame 202 is fitted with a rubber bush 270 consisting of two identical halves 270A and 270B each including a tubular portion received in the through hole 203 and a radial flange radially outwardly extending over the corresponding surface of the electric mounting portion 203 surrounding the through hole 203. After placing the electric mount frame 202 on the support bases 53 of the lower frame 2C via the corresponding flanges of the rubber bushes 270, threaded bolts B1 are passed into the through holes 203a (or central holes of the rubber bushes 270), and threaded into the threaded holes 54a of the support bases 53. Thus, the rubber bushes 270 insulate and protect the electric mount frame 202 from the vibrations that may otherwise be transmitted from the lower frame 2C.

The electric unit 11, in its installed state, is located in the narrow section 2A connected to an upper part of the lower frame 2C, and, in particular, the blower fan 247, left motor driver circuit board 243 and right motor driver circuit board 244 are located between the two sets of vent openings 39 formed in the front and rear walls 34 of the lower frame 2C, respectively, so that the cooling air introduced from the front vent openings 39 is passed through the blower fan 247 and the space 246 between the left and right motor driver circuit boards 243 and 244 before being expelled from the rear vent openings 39. Therefore, the left and right motor driver circuit boards 243 and 244 including power devices 243a and 244a which are the major sources of heat among the various components of the electric unit 11 can be efficiently cooled. Also, as the electric unit 11 is located in the narrow section 2A in an upper part of the lower frame 2C, the flow path between the two sets of vent openings 39 is relatively short, and this also contributes to the efficient cooling of the electric unit 11.

As shown in FIGS. 4 and 8, the batter unit 10 includes a battery 281 consisting of two arcuate parts, one received in the front space 26A and the other in the rear space 26B, and a pair of battery management circuit boards 282. Each part of the battery 281 consists of a plurality of battery modules. The battery modules are each cylindrical in shape (not shown in the drawings), and are bundled together so as to fit in the inner space of the upper frame 2B. The battery management circuit boards 282 include a battery management circuit 285 comprising a CPU formed by a microcomputer and associated memory (see FIG. 12). The battery management circuit 285 is connected to the battery 281 so as to control the charging and discharging of the battery 281, and select the battery modules that are to be used at each particular moment according to the remaining charge of the battery 281 detected by a battery charge detecting unit 286 which will be described hereinafter.

The battery management circuit boards 282 are not required to be provided on the battery parts 281, but may also be provided within the electric unit 11. However, by placing the battery management circuit boards 282 as a part of the battery unit 11 within the upper frame, the recharging of the battery parts 181 can be conveniently performed. For instance, the upper frame 2B (upper structure 13) may be recharged and stored so as to be interchangeable used for different lower frames 2C (lower structures 14).

The two parts of the battery 281 of the battery unit 10 are passed into the front space 26A and rear space 26B, respectively, from the lower opening 25 of the upper frame 2B, and is supported from below by a battery bracket 291 which is in turn secured to the support bases 51 of the upper frame 2B by using threaded bolts. By thus distributing the weight of the battery unit 10 between the front and rear parts of the upper frame 2B, the gravitational center of the upper frame 2B is prevented from offsetting in the fore and aft direction, and this simplifies the inverted pendulum control of the vehicle 1 and the transportation of the vehicle 1 by using the grip handle 71.

Referring to FIG. 8, the third connector base 294 is fixedly attached to the front end of the battery bracket 291 by using threaded bolts, and extends forward therefrom. A fourth connector base 295 is fixedly attached to the rear end of the battery bracket 291 by using threaded bolts, and extends rearward therefrom.

A third connector 297 is secured to the third connector base 294 by using threaded bolts, and is electrically connected to the wiring extending from the battery management circuit boards 282. The third connector 297 is complementary to the first connector 214 so as to be connected thereto, and is provided with a first guide hole 298 extending in the vertical direction and configured to receive the first guide pin 215 of the first connector base 211.

A fourth connector 301 is secured to the fourth connector base 295 by using threaded bolts, and is electrically connected to the wiring extending from the switch panel 41A. The fourth connector 301 is complementary to the second connector 216 so as to be connected thereto, and is provided with a second guide hole 302 extending in the vertical direction and configured to receive the second guide pin 217 of the second connector base 212.

The structure for connecting the upper structure 13 including the upper frame 2B, seat assembly 29 and battery unit 10 to the lower structure 14 including the lower frame 2C, drive unit 3 and electric unit 11 is described in the following with reference to FIGS. 3 and 10. In FIG. 10, some of the components are omitted from the illustration for the convenience of illustration. When joining the upper and lower structures 13 and 14 to each other, the lower opening 25 of the upper frame 2B is opposed to the upper opening 31 of the lower frame 2C, and the first guide pin 215 of the lower structure 14 is fitted into the first guide hole 298 of the upper structure 13 while the second guide pin 217 of the lower structure 14 is fitted into the second guide hole 302 of the upper structure 13. This causes the first connector 214 to be connected to the third connector 297, and the second connector 216 to the fourth connector 301. Thereby, the upper and lower structures 13 and 14 are electrically connected to each other so that distribution of electric power and transmission of control signals can be effected between the upper and lower structures 13 and 14.

The lower surface of the wall part of the upper frame 2B defining the recess 29 abuts the upper surface of the connecting member base 210 connected to the input shaft 206 of the upper load sensor 6, and the free end of the input shaft 206 is passed upward through the central connecting hole 30 of the recess 29. By threading the nut 314 onto the input shaft 206, the bottom wall of the recess 29 is firmly held between the connecting member base 210 and nut 314, and the upper frame 2B is supported by the input shaft 206 of the upper load sensor 6. The upper opening 31 of the lower frame 2C is slightly smaller that the lower opening 25 of the upper frame 2B so that the peripheral wall defining the upper opening 31 is received by the lower opening 25 of the upper frame 2B.

Thus, the upper structure 13 is supported by the lower structure 14 solely via the load sensor 6 so that the load created by the seating of a vehicle occupant D on the seat assembly 29 is transmitted to the input shaft 206 of the upper load sensor 6 via the upper structure 13.

As shown in FIG. 12, the control circuit 261 receives signals from the upper load sensor 6, inclination sensor 7, step load sensors 8, rotary encoders 9 and battery management circuit 285 via the input interface circuit 265. The control circuit 261 is configured to generate PWM signals for driving the left driver circuit 253 and right driver circuit 254 via the output interface circuit 266 so as to maintain the vehicle 1 in an upright posture or perform the inverted pendulum control according to the received signals.

The upper load sensor 6 forwards a signal corresponding to the load applied to the input shaft 206 to the control circuit 261. Each step load sensor 8 forwards a signal corresponding to the load applied to the corresponding step 183 to the control circuit 261. The inclination sensor 7 forwards a signal corresponding to the inclination thereof with respect to a prescribed reference line to the control circuit 261. Each rotary encoder 9 forwards a signal corresponding to the angular position of the corresponding rotor shaft (output shaft) 70 to the control circuit 261.

The control circuit 261 computes the rotational speeds of the two electric motors 82 according to the signals from the rotary encoders 9, and use the obtained speeds for the drive control of the two electric motors 82.

The control circuit 261 computes an inclination angle $\theta$ of the axial line B connecting the rotational center A of the main wheel 85 and the gravitational center of the vehicle 1 including the vehicle occupant D with respect to a vertical (plumb) line according to the signal from the inclination sensor 7 by using an inclination angle determining unit 269 configured to execute a prescribed computing process. FIG. 13b shows the state where $\theta$ has a small value which may be a prescribed reference value. In the xyz rectilinear coordinate system having an x-axis extending in the fore and aft direction (positive in the forward direction and negative in the rearward direction), a y-axis extending in the lateral direction (positive in the rightward direction and negative in the leftward direction) and a z-axis extending in the vertical direction (positive in the upward direction and negative in the downward direction), the inclination angle $\theta$ may have an x-component $\theta x$ or an inclination angle in the x-axis direction, and a y-component $\theta y$ or an inclination angle in the y-axis direction.

The control circuit 261 performs the inverted pendulum control according to the inclination angle $\theta$. In the inverted pendulum control, the vehicle 1 is moved by using the drive unit 3 so that the combined gravitational center of the vehicle 1 itself and vehicle occupant is positioned approximately above the road contact point of the drive unit 3 (main wheel 85), and the inclination angle $\theta$ coincides with a reference angle $\theta t$ given as a control target value. As the position of the combined gravitational center varies depending on the presence of the vehicle occupant and the riding posture of the vehicle occupant, the reference angle $\theta t$ is defined individually for the vehicle 1 without a vehicle occupant, the vehicle carrying a vehicle occupant in a sitting posture and the vehicle carrying a vehicle occupant in a standing posture.

The control circuit 261 generates PWM signals for controlling the left driver circuit 253 and right driver circuit 254 so as to agree the inclination angle $\theta$ with the reference angle $\theta t$ for each of the vehicle occupant situations. According to the given PWM signals, the left driver circuit 253 and right driver circuit 254 supply electric power to the electric motors 82 to actuate them in a corresponding manner.

The structure described in the foregoing allows the vehicle 1 to maintain an upright posture in which the axial line of the lower structure 14 agrees with the reference angle $\theta t$ by virtue of the inverted pendulum control. The vehicle 1 is driven by the vehicle operator shifting his or her weight in a prescribed direction. When the weight of the vehicle operator is shifted in a desired direction, the axial line of the lower structure tilts in the desired direction. The control circuit 261 then drives the drive unit 3 so as to agree the inclination angle with the reference angle of the corresponding vehicle occupant situation, and this causes the vehicle to travel in the desired direction.

In the vehicle described above, because the drive unit 3 and battery unit 10 which account for a large part of the weight of the vehicle 1 are spaced away from each other in a vertical direction, and the inclination angle sensor 7 is placed between them, not only the vehicle can be constructed in a highly compact manner but also the inclination angle sensor 7 can be placed approximately on the gravitational center of the vehicle 1 or in the narrow section 2A. This contributes to the minimization in the error in estimating the acceleration (or the inclination angle of the vehicle 1) based on the detection result of the inclination angle sensor 7, and this improves the control response of the system. Furthermore, as the weight of the vehicle is balanced along the lengthwise (vertical) direction thereof, the transportation of the vehicle 1, for instance by orienting it sideways, can be facilitated.

In the foregoing embodiment, because the seat assembly 29 is provided on the upper frame 2B, the weight of the seat assembly 29 combined with the weight of the battery unit 10 helps to match the weight of the upper structure with that of the lower structure (which is normally heavier owing to the presence of the drive unit 3). Also, the presence of the steps 183 in the lower frame 2C allow the load of the vehicle occupant to be distributed between the upper frame 2B and lower frame 2C, and this not only contributes to the even distribution of the load on the frame 2 but also helps the gravitational center of the vehicle 1 to coincide with the position of the inclination angle sensor.

Figure 16:
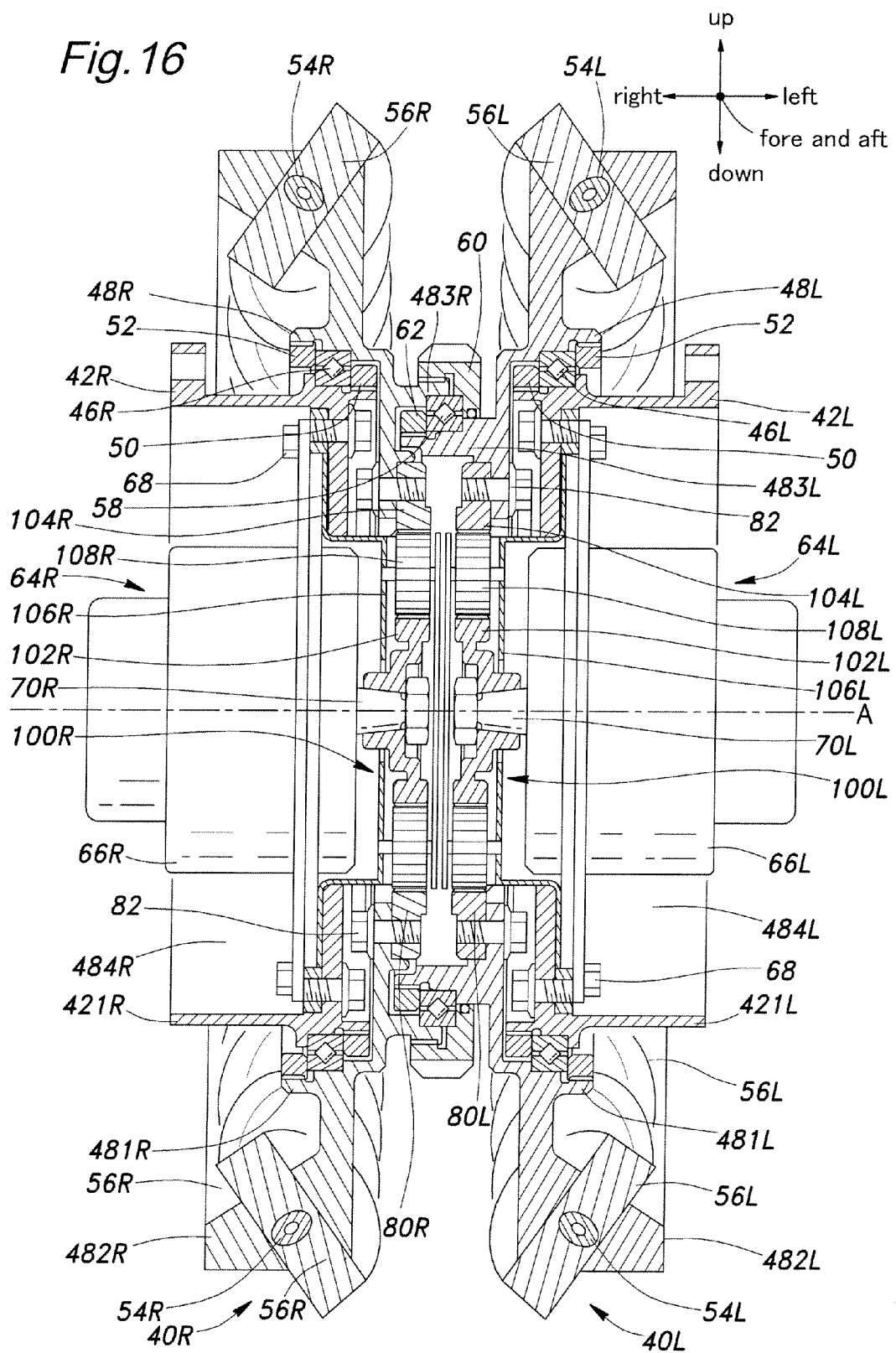
FIG. 16 is a view similar to FIG. 6 showing a second embodiment of the present invention.

FIG. 16 shows a second embodiment of the present invention. In FIG. 16, the parts corresponding to the first embodiment are denoted with like numerals without repeating the description of such parts. In this embodiment, a pair of planetary gear devices 100 are used, instead of the wave gear devices 72 of the first embodiment. Each planetary gear device 100 comprises a sun gear 102, a ring gear 104 concentrically arranged with respect to the sun gear 102, and a plurality of planetary pinions 108 rotatably supported by a pinion carrier 106 and meshing with both the sun gear 102 and ring gear 104.

The sun gear 102 serves as an input member, and is connected to the rotor shaft 70 of the electric motor 64. The ring gear 104 serves as an output member, and is connected to the drive disk 48. The pinion carrier 106 serves as a reaction member, and is fixedly attached to the mount member 42.

Thus, the rotational output of the electric motor 64 is reduced in speed by the planetary gear device 100, and is transmitted individually to the corresponding drive disk 48. In this embodiment also, the drive disks 48L and 48R are coaxially connected to the electric motors 64 on the common axial line A.

Thereby, similarly as the first embodiment, each drive disk 48 is connected to the corresponding electric motor 64 via the planetary gear device 72 all in a coaxial relationship so that a highly compact design is achieved. In particular, both the axial and radial dimensions can be minimized. Also, the electric motor 64, planetary gear device 100 and the drive disk 48 fitted with the drive rollers 56 can be formed as a single assembly. This again provides an enhanced convenience and high efficiency in the assembly work as well as in the maintenance work.

Although the present invention has been described in terms of a preferred embodiment thereof, it is obvious to a person skilled in the art that various alterations and modifications are possible without departing from the scope of the present invention which is set forth in the appended claims. For instance, the foregoing embodiment was directed to a monocycle type vehicle, but may also be applied to vehicles using different number of wheels, crawlers, bipedal mechanisms and other modes of propulsion.

The contents of the original Japanese patent applications on which the Paris Convention priority claim is made for the present application as well as the contents of any prior art references mentioned in this application are incorporated in this application by reference.

The invention claimed is:

1. A frictional drive device, comprising
a frame;
a pair of drive disks each rotatably supported by the frame around a central axial line in a mutually opposing relationship;
a pair of actuators supported by the frame for individually rotatively actuating the drive disks;
a plurality of drive rollers arranged along an outer periphery of each drive disk and each having a rotational center line so as to be rotatable along a prescribed plane of rotation; and
an annular main wheel disposed approximately coaxially with respect to the central axial line and engaged by the drive rollers of the drive disks, the main wheel comprising an annular member and a plurality of driven rollers supported along the annular member so as to be rotatable around a tangential line of the annular member;
wherein each actuator comprises a rotary actuator coaxially disposed with respect to the corresponding drive disk.

2. The frictional drive device according to claim 1, wherein the two drive disks are connected to each other by a coupling mechanism that couples the two drive disks in a mutually freely rotatable manner while preventing at least radial relatively movement between the two drive disks.

3. The frictional drive device according to claim 1, wherein the two drive disks are connected to each other by a coupling mechanism that couples the two drive disks in a mutually freely rotatable manner while preventing at least axial relatively movement between the two drive disks.

4. The inverted pendulum type vehicle according to claim 1, wherein the prescribed plane of rotation is neither parallel nor perpendicular to the central axial line.

5. The frictional drive device according to claim 1, wherein a plurality of slots are formed along a peripheral part of each drive disk, each slot extending along the prescribed plane of rotation, and each drive roller is rotatably supported by the drive disk via a roller shaft passed perpendicularly across the corresponding slot.

6. The frictional drive device according to claim 5, wherein a low frictional coating is formed on at least one of mutually sliding surfaces of each drive roller and an opposing wall surface of the corresponding slot.

7. An inverted pendulum type vehicle using the frictional drive device as defined in claim 1 as a drive unit, wherein the main wheel is used as a road contact wheel.

8. The inverted pendulum type vehicle according to claim 7, wherein each actuator comprises an electric motor, and the vehicle is provided with a vertically elongated vehicle frame, a battery for powering the electric motor being mounted on an upper part of the vehicle frame, and the drive unit being mounted on a lower part of the vehicle frame.

9. The frictional drive device according to claim 1, wherein each actuator at least partly overlaps with the drive rollers of the corresponding drive disk along the central axial line thereof.

10. The frictional drive device according to claim 9, further comprising a speed reduction unit for transmitting a rotational output of each actuator to the corresponding drive disk at a reduced speed ratio, the actuator, speed reduction unit and drive disk being arranged in a coaxial relationship.

11. The frictional drive device according to claim 10, wherein the speed reduction unit comprises a wave gear device.

12. The frictional drive device according to claim 10, wherein the speed reduction unit comprises a planetary gear device.

* * * * *